United States Patent
Denker et al.

(10) Patent No.: US 10,366,373 B1
(45) Date of Patent: Jul. 30, 2019

(54) APPARATUS FOR ACCESS CONTROL AND PROCESSING

(75) Inventors: Dennis Denker, Scottsdale, AZ (US); Sean Moriarty, Pasadena, CA (US); David Scarborough, Oak Hill, VA (US); Charles Plamondon, Quebec (CA); Matthew Siegel, Tampa, FL (US)

(73) Assignee: LIVE NATION ENTERTAINMENT, INCORPORATED, Beverly Hills, CA (US)

( * ) Notice: Subject to any disclaimer, the term of this patent is extended or adjusted under 35 U.S.C. 154(b) by 1888 days.

(21) Appl. No.: 10/731,410

(22) Filed: Dec. 9, 2003

Related U.S. Application Data

(60) Provisional application No. 60/431,865, filed on Dec. 9, 2002.

(51) Int. Cl.
*G06Q 20/04* (2012.01)

(52) U.S. Cl.
CPC .............................. *G06Q 20/0453* (2013.01)

(58) Field of Classification Search
USPC ............................................................ 705/1
See application file for complete search history.

(56) References Cited

U.S. PATENT DOCUMENTS

| | | |
|---|---|---|
| 3,581,072 A | 5/1971 | Nymeyer |
| 3,622,995 A | 11/1971 | Dilks |
| 4,412,287 A | 10/1983 | Braddock, III |
| 4,603,232 A | 7/1986 | Kurland et al. |
| 4,788,643 A | 11/1988 | Trippe et al. |
| 4,789,928 A | 12/1988 | Fujisaki |
| 4,799,156 A | 1/1989 | Shavit et al. |
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Gradl et al. |
| 4,980,826 A | 12/1990 | Wagner |
| 5,077,665 A | 12/1991 | Silverman et al. |
| 5,095,196 A | 3/1992 | Miyata |
| 5,101,353 A | 3/1992 | Lupien et al. |
| 5,112,050 A | 5/1992 | Koza et al. |

(Continued)

FOREIGN PATENT DOCUMENTS

| | | |
|---|---|---|
| AU | 2000229843 | 8/2006 |
| AU | 2006203419 | 1/2008 |

(Continued)

OTHER PUBLICATIONS

Stubhub, "Buyer Handbook",Apr. 2, 2002, www.stubhub.com.*

(Continued)

*Primary Examiner* — Paul R Fisher
(74) *Attorney, Agent, or Firm* — Kilpatrick Townsend & Stockton, LLP

(57) ABSTRACT

A computer-based ticket system enables users to electronically transfer tickets to other users, and to obtain tickets from other users. A first software module executing in a server is configured to cancel a first ticket for a first seat at first event associated with a first user, and issue a second ticket for the first seat to a second user at least partly in response to an instruction from the first user received from a first user terminal and an instruction from the second user received from a second user terminal.

43 Claims, 22 Drawing Sheets

(56) References Cited

U.S. PATENT DOCUMENTS

| | | |
|---|---|---|
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Van Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A * | 3/1996 | Delfer et al. ............... 235/379 |
| 5,518,239 A | 5/1996 | Johnston |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,664,115 A | 9/1997 | Fraser |
| 5,724,520 A | 3/1998 | Goheen |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,797,127 A | 8/1998 | Walker et al. |
| 5,812,670 A | 9/1998 | Micali |
| 5,818,914 A | 10/1998 | Fujisaki |
| 5,826,241 A | 10/1998 | Stein et al. |
| 5,835,896 A | 10/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 5,930,761 A | 7/1999 | O'Toole |
| 6,023,685 A | 2/2000 | Brett et al. |
| 6,023,686 A | 2/2000 | Brown |
| 6,026,383 A | 2/2000 | Ausubel |
| 6,047,264 A | 2/2000 | Fisher et al. |
| 6,044,363 A | 3/2000 | Mori et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A | 9/2000 | Mann et al. |
| 6,119,945 A | 9/2000 | Muller et al. |
| 6,149,055 A * | 11/2000 | Gatto ............... 235/379 |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,308,159 B1 | 10/2001 | Strohl |
| 6,341,353 B1 | 1/2002 | Herman et al. |
| 6,418,415 B1 | 7/2002 | Walker et al. |
| 6,434,398 B1 | 8/2002 | Inselberg |
| 6,446,045 B1 | 9/2002 | Stone et al. |
| 6,446,917 B2 | 9/2002 | Dieckmann et al. |
| 6,449,346 B1 | 9/2002 | Katz |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,556,548 B1 | 4/2003 | Kirby et al. |
| 6,603,568 B1 | 8/2003 | Sansone |
| 6,604,107 B1 | 8/2003 | Wang |
| 6,658,390 B1 | 12/2003 | Walker et al. |
| 6,662,230 B1 | 12/2003 | Eichstaedt et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,489 B1 | 3/2004 | Kurauchi et al. |
| 6,704,713 B1 | 3/2004 | Brett et al. |
| 6,736,322 B2 | 5/2004 | Gobburu et al. |
| 6,820,201 B1 | 11/2004 | Lincoln et al. |
| 6,829,644 B2 | 12/2004 | Aufderheide |
| 6,842,741 B1 | 1/2005 | Fujimura |
| 6,847,969 B1 | 1/2005 | Mathai et al. |
| 6,850,901 B1 | 2/2005 | Hunter et al. |
| 6,854,651 B2 | 2/2005 | Smith et al. |
| 6,873,969 B2 | 3/2005 | Stone et al. |
| 6,877,661 B2 | 4/2005 | Webb et al. |
| 6,877,665 B2 | 4/2005 | Challa et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,937,998 B1 | 8/2005 | Swartz et al. |
| 6,944,599 B1 | 9/2005 | Vogel et al. |
| 6,963,854 B1 | 11/2005 | Boyd et al. |
| 6,965,914 B2 | 11/2005 | Dowling |
| 6,999,936 B2 | 2/2006 | Sehr |
| 7,003,485 B1 | 2/2006 | Young |
| 7,004,388 B2 | 2/2006 | Kohita |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,076,558 B1 | 7/2006 | Dunn |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,124,062 B2 | 10/2006 | Gebhart |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,162,454 B1 | 1/2007 | Donner et al. |
| 7,171,472 B2 | 1/2007 | O'Brien et al. |
| 7,177,945 B2 | 2/2007 | Hong et al. |
| 7,191,147 B2 | 3/2007 | Heene et al. |
| 7,213,754 B2 | 5/2007 | Eglen et al. |
| 7,228,350 B2 | 6/2007 | Hong et al. |
| 7,333,943 B1 * | 2/2008 | Charuk et al. ............... 705/26 |
| 7,403,993 B2 | 7/2008 | John et al. |
| 7,555,361 B2 | 6/2009 | Nakamura et al. |
| 7,634,503 B2 | 12/2009 | Venugopal et al. |
| 7,720,746 B2 | 5/2010 | Brett |
| RE43,157 E | 2/2012 | Bishop et al. |
| 2001/0018660 A1 | 8/2001 | Sehr |
| 2001/0034687 A1 | 10/2001 | Bushonville et al. |
| 2001/0049652 A1 | 12/2001 | Nakajima |

(56) References Cited

U.S. PATENT DOCUMENTS

| | | |
|---|---|---|
| 2002/0004762 A1 | 1/2002 | Izumoto |
| 2002/0019785 A1* | 2/2002 | Whitman .................. 705/28 |
| 2002/0023955 A1* | 2/2002 | Frank et al. ............... 235/382 |
| 2002/0040308 A1 | 4/2002 | Hasegawa et al. |
| 2002/0040346 A1 | 4/2002 | Kwan |
| 2002/0042729 A1* | 4/2002 | Yajima et al. .................. 705/5 |
| 2002/0052758 A1 | 5/2002 | Arthur et al. |
| 2002/0052965 A1 | 5/2002 | Dowling |
| 2002/0062265 A1 | 5/2002 | Poon |
| 2002/0065763 A1 | 5/2002 | Taylor et al. |
| 2002/0065783 A1 | 5/2002 | Na et al. |
| 2002/0072999 A1 | 6/2002 | Andres et al. |
| 2002/0082879 A1 | 6/2002 | Miller et al. |
| 2002/0082969 A1 | 6/2002 | O'Keeffe et al. |
| 2002/0087456 A1 | 7/2002 | Abeshouse et al. |
| 2002/0091555 A1 | 7/2002 | Leppink |
| 2002/0094090 A1 | 7/2002 | Iino |
| 2002/0095357 A1 | 7/2002 | Hunter et al. |
| 2002/0095383 A1 | 7/2002 | Mengin et al. |
| 2002/0099831 A1 | 7/2002 | Tsunogai |
| 2002/0103849 A1 | 8/2002 | Smith |
| 2002/0107779 A1 | 8/2002 | Maltzman |
| 2002/0116343 A1* | 8/2002 | Nakamura et al. .......... 705/65 |
| 2002/0128922 A1 | 9/2002 | Joao |
| 2002/0138325 A1 | 9/2002 | Mashimo et al. |
| 2002/0138751 A1 | 9/2002 | Dutta |
| 2002/0138770 A1 | 9/2002 | Dutta |
| 2002/0138771 A1 | 9/2002 | Dutta |
| 2002/0143860 A1* | 10/2002 | Catan .................... 709/203 |
| 2002/0156715 A1 | 10/2002 | Wall et al. |
| 2002/0169623 A1 | 11/2002 | Call et al. |
| 2002/0174026 A1 | 11/2002 | Pickover et al. |
| 2002/0178093 A1 | 11/2002 | Dean et al. |
| 2002/0178226 A1* | 11/2002 | Anderson et al. ............ 709/206 |
| 2002/0188523 A1* | 12/2002 | Hyyppa et al. .............. 705/26 |
| 2002/0188551 A1 | 12/2002 | Grove et al. |
| 2003/0018582 A1* | 1/2003 | Yaacovi ................... 705/51 |
| 2003/0023500 A1* | 1/2003 | Boies et al. ................ 705/26 |
| 2003/0024988 A1* | 2/2003 | Stanard ................. 235/462.01 |
| 2003/0040943 A1 | 2/2003 | Bates et al. |
| 2003/0061303 A1 | 3/2003 | Brown et al. |
| 2003/0067464 A1 | 4/2003 | Gathman et al. |
| 2003/0069762 A1 | 4/2003 | Gathman et al. |
| 2003/0069763 A1 | 4/2003 | Gathman et al. |
| 2003/0069764 A1 | 4/2003 | Gathman et al. |
| 2003/0069789 A1 | 4/2003 | Gathman et al. |
| 2003/0069810 A1 | 4/2003 | Gathman et al. |
| 2003/0069827 A1 | 4/2003 | Gathman et al. |
| 2003/0069829 A1 | 4/2003 | Gathman et al. |
| 2003/0093387 A1 | 5/2003 | Nakfoor |
| 2003/0105641 A1 | 6/2003 | Lewis |
| 2003/0120502 A1 | 6/2003 | Robb et al. |
| 2003/0154142 A1 | 8/2003 | Ginsburg et al. |
| 2003/0154169 A1 | 8/2003 | Yanai |
| 2003/0163373 A1 | 8/2003 | Cornateanu |
| 2003/0164400 A1 | 9/2003 | Boyd |
| 2003/0171960 A1 | 9/2003 | Skinner |
| 2003/0177022 A1 | 9/2003 | Francis |
| 2003/0185197 A1 | 10/2003 | Banerjee et al. |
| 2003/0187802 A1 | 10/2003 | Booth |
| 2003/0229790 A1 | 12/2003 | Russell |
| 2003/0236736 A1 | 12/2003 | Harmon et al. |
| 2004/0006497 A1 | 1/2004 | Nestor et al. |
| 2004/0019571 A1 | 1/2004 | Hurwitz et al. |
| 2004/0039635 A1 | 2/2004 | Linde et al. |
| 2004/0039696 A1 | 2/2004 | Harmon et al. |
| 2004/0049412 A1 | 3/2004 | Johnson |
| 2004/0073439 A1 | 4/2004 | Shuster |
| 2004/0083156 A1 | 4/2004 | Schulze |
| 2004/0086257 A1 | 5/2004 | Werberig et al. |
| 2004/0093175 A1 | 5/2004 | Tan |
| 2004/0111303 A1 | 6/2004 | Francis |
| 2004/0128257 A1 | 6/2004 | Okamoto et al. |
| 2004/0128516 A1 | 6/2004 | Okamoto et al. |
| 2004/0138962 A1 | 7/2004 | Kopelman et al. |
| 2004/0172270 A1 | 9/2004 | Sugimoto et al. |
| 2004/0204990 A1 | 10/2004 | Lee et al. |
| 2004/0204991 A1 | 10/2004 | Monahan et al. |
| 2004/0215527 A1 | 10/2004 | Grove et al. |
| 2004/0220821 A1 | 11/2004 | Ericsson et al. |
| 2005/0001711 A1 | 1/2005 | Doughty et al. |
| 2005/0015303 A1 | 1/2005 | Dubin et al. |
| 2005/0015308 A1 | 1/2005 | Grove et al. |
| 2005/0021364 A1 | 1/2005 | Nakfoor |
| 2005/0021365 A1 | 1/2005 | Nakfoor |
| 2005/0021450 A1 | 1/2005 | Nakfoor |
| 2005/0027608 A1 | 2/2005 | Wiesmuller et al. |
| 2005/0027641 A1 | 2/2005 | Grove et al. |
| 2005/0027863 A1 | 2/2005 | Talwar et al. |
| 2005/0043994 A1 | 2/2005 | Walker et al. |
| 2005/0065866 A1 | 3/2005 | Grove et al. |
| 2005/0071245 A1 | 3/2005 | Norins, Jr. et al. |
| 2005/0131809 A1 | 6/2005 | Watt, II et al. |
| 2005/0138175 A1 | 6/2005 | Kumar et al. |
| 2005/0139661 A1 | 6/2005 | Eglen et al. |
| 2005/0139662 A1 | 6/2005 | Eglen et al. |
| 2005/0140675 A1 | 6/2005 | Billingsley et al. |
| 2005/0144115 A1 | 6/2005 | Brett |
| 2005/0149458 A1 | 7/2005 | Eglen et al. |
| 2005/0160020 A1 | 7/2005 | Asher et al. |
| 2005/0165758 A1 | 7/2005 | Kasten et al. |
| 2005/0209914 A1 | 9/2005 | Nguyen et al. |
| 2005/0209954 A1 | 9/2005 | Asher et al. |
| 2005/0228722 A1 | 10/2005 | Embree |
| 2005/0240453 A1 | 10/2005 | Lyons |
| 2005/0273405 A1 | 12/2005 | Chen |
| 2006/0017541 A1 | 1/2006 | Nguyen |
| 2006/0069780 A1 | 3/2006 | Batni et al. |
| 2006/0082439 A1 | 4/2006 | Bazakos et al. |
| 2006/0085396 A1 | 4/2006 | Evans et al. |
| 2006/0095344 A1 | 5/2006 | Nakfoor |
| 2006/0100985 A1 | 5/2006 | Mark et al. |
| 2006/0105783 A1 | 5/2006 | Giraldin et al. |
| 2006/0108418 A1 | 5/2006 | Rice |
| 2006/0111967 A1 | 5/2006 | Forbes |
| 2006/0116916 A1 | 6/2006 | Bowman et al. |
| 2006/0124734 A1 | 6/2006 | Wallerstorfer et al. |
| 2006/0126201 A1 | 6/2006 | Jain |
| 2006/0140374 A1 | 6/2006 | Light et al. |
| 2006/0143094 A1 | 6/2006 | Kohout et al. |
| 2006/0143109 A1 | 6/2006 | Goel |
| 2006/0143698 A1 | 6/2006 | Ohara |
| 2006/0144946 A1 | 7/2006 | Kuriyama et al. |
| 2006/0148566 A1 | 7/2006 | Lakshminarasimha |
| 2006/0155659 A1 | 7/2006 | DiCesare |
| 2006/0155857 A1 | 7/2006 | Feenan et al. |
| 2006/0161474 A1 | 7/2006 | Diamond et al. |
| 2006/0167756 A1 | 7/2006 | VonBergen et al. |
| 2006/0178930 A1 | 8/2006 | Kim |
| 2006/0190387 A1 | 8/2006 | Molloy |
| 2006/0190388 A1 | 8/2006 | Molloy |
| 2006/0190389 A1 | 8/2006 | Molloy |
| 2006/0190390 A1 | 8/2006 | Molloy |
| 2006/0195356 A1 | 8/2006 | Nerenhausen et al. |
| 2006/0232110 A1 | 10/2006 | Ovadia |
| 2006/0244564 A1 | 11/2006 | Madsen |
| 2006/0249572 A1 | 11/2006 | Chen et al. |
| 2006/0271462 A1 | 11/2006 | Harmon |
| 2006/0277130 A1 | 12/2006 | Harmon |
| 2006/0293929 A1 | 12/2006 | Wu et al. |
| 2006/0293994 A1 | 12/2006 | Stuart |
| 2007/0012765 A1 | 1/2007 | Trinquet et al. |
| 2007/0017979 A1 | 1/2007 | Wu et al. |
| 2007/0022020 A1 | 1/2007 | Bernstein |
| 2007/0027794 A1 | 2/2007 | Brett |
| 2007/0027798 A1 | 2/2007 | Brett |
| 2007/0033131 A1 | 2/2007 | Brett |
| 2007/0038582 A1 | 2/2007 | Brett |
| 2007/0055554 A1 | 3/2007 | Sussman et al. |
| 2007/0087756 A1 | 4/2007 | Hoffberg |
| 2007/0124232 A1 | 5/2007 | Brett |
| 2007/0143194 A1 | 6/2007 | Fraser et al. |
| 2007/0245351 A1 | 10/2007 | Sussman et al. |
| 2008/0021998 A1 | 1/2008 | Wentink |

(56) References Cited

U.S. PATENT DOCUMENTS

| | | |
|---|---|---|
| 2008/0027827 A1 | 1/2008 | Eglen et al. |
| 2008/0059384 A1 | 3/2008 | Eglen et al. |
| 2008/0065566 A1 | 3/2008 | Eglen et al. |
| 2008/0154623 A1 | 6/2008 | Derker et al. |
| 2008/0235110 A1 | 9/2008 | Carter et al. |
| 2008/0243838 A1 | 10/2008 | Scott et al. |
| 2010/0113072 A1 | 5/2010 | Gibson et al. |
| 2010/0169130 A1 | 7/2010 | Fineman et al. |
| 2011/0060834 A1 | 3/2011 | Denker et al. |
| 2011/0125538 A1 | 5/2011 | Joao |

FOREIGN PATENT DOCUMENTS

| | | |
|---|---|---|
| EP | 0828223 A2 | 3/1998 |
| EP | 1 054 335 A2 | 11/2000 |
| EP | 1069539 A2 | 1/2001 |
| JP | 53 142300 A | 12/1978 |
| JP | 5266049 | 10/1993 |
| JP | 11031204 A | 2/1999 |
| JP | 2001236459 A | 8/2001 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 99/60489 | 11/1999 |
| WO | WO 00/28485 | 5/2000 |
| WO | WO 00/62260 | 10/2000 |
| WO | WO 00/74300 A1 | 12/2000 |
| WO | WO 00/75838 A1 | 12/2000 |
| WO | WO 01/03040 A1 | 1/2001 |
| WO | WO 01/08065 A1 | 2/2001 |
| WO | WO 01/41021 A1 | 6/2001 |
| WO | WO 01/41085 A2 | 6/2001 |
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 | 9/2001 |
| WO | WO 01/84473 | 11/2001 |
| WO | WO 02/03174 | 1/2002 |
| WO | WO 02/35322 A2 | 5/2002 |
| WO | WO 03/027808 A2 | 4/2003 |

OTHER PUBLICATIONS

Milwaukee Journal Sentinel, "Riverside comedy show canceled", Aug. 2, 1996, Wilwaukee, Wis. p. 7.*
New Straits Times, "Wanted Live in Concert postponed to after Raya", Oct. 25, 2000, Kuala Lumpur, p. 15.*
Yael Schacher, "Ticket Scalping", Jun. 11, 2001, Gotham Gazette, http://www.gothamgazette.com/article//20010611/200/165.*
Office Action in U.S. Appl. No. 11/453,286, dated Nov. 5, 2007.
Pelline, "Cathay Pacific to Auction Off Airline Tickets on the Internet", San Francisco Chronicle, p. C4 (Apr. 30, 1996).
Article; Business Wire: Season Ticket Solutions Announces Availability of Ticket Exchange for Sporting Teams and Entertainment Venues; Jul. 30, 2001; 3 pages.
"Acteva and Enspot.com Sign Agreement to Provide On-Line Ticketing, Broader Distribution", Business Wire (Dec. 3, 1999).
"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways—USA Receives More than 1,300 Bids During First Five Days of CyberAuction", Business Wire (Oct. 18, 1995).
"Cathay Pacific Airways—USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 10, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", the Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Garza, "Space Cruise", Reason (May 2000).
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).
Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).

(56) References Cited

OTHER PUBLICATIONS

Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
Hes, et al. "At Face Value" on biometrical identification and privacy, Registratiekamer, Sep. 1999; 78 pages.
Fujimura, "XML Ticket: Generalized Digital Ticket Definition Language", The W3C Signed XML Workshop—Copyright © 1999, 33 pages.
Matsuyama, et al. "Distributed Digital-Ticket Management for Rights Trading System", E-Commerce, 1999; pp. 110-118.
In, Shirley Siu Weng, "A Proposed Electronic Ticket Management for trading Service in Internet", Feb. 9, 2001; 7 pages.
Article from Smart Card News, "Major Players Form Proton World International", Aug. 1998, pp. 141-160.
Fujimura, et al. "General-purpose Digital Ticket Framework", NTT Information and Communication Systems Labs, USENIX Workshop on Electronic Commerce; Aug. 31-Sep. 1998.
Fujimura, et al. "Digital-Ticket-Controlled Digital Ticket Circulation", NTT Information Sharing Platform Laboratories, USENIX Security Symposium, Aug. 23-26, 1999.
Chui, et al. "Auction on the Internate—A Preliminary Study", Department of Marketing, HK Univiersity of Science and Technology; 1999, pp. 1-7.
Asokan, et al. "Semper Consortium: Advanced Services, Architecture and Design", Deliverable D10 of Acts Project ACO26, Mar. 15, 1999.
U.S. Appl. No. 09/702,794, filed Nov. 1, 2000.
Office Action dated Aug. 2, 2007 in U.S. Appl. No. 11/453,286.
Office Action dated Jul. 27, 2007 in U.S. Appl. No. 11/475,733.
International Search Report for PCT Application—PCT /US06/10295, dated Sep. 14, 2007.
International Search Report and Written Opinion (dated Apr. 11, 2008); International Application No. PCT/US07/86651; filed Dec. 6, 2007.
International Search Report and Written Opinion; PCT/US08/72364 (filed: Aug. 6, 2008); dated Jan. 30, 2009.
Fisher, "Secondary Market in Consolidation Mode", Street & Smith's Sports Business Journal, p. 3 (Jul. 23, 2007).
Flint, "Cyber Hope or Cyber Hype?", Air Transport World (Oct. 1996).
Happel, et al.; "Creating a Futures Market for Major Event Tickets: Problems and Prospects"; *Cato Journal*, vol. 21, No. 3; 2002 (pp. 443-461).
Muret, "More Teams Gearing up to Offer Option of Stored-Credit Tickets", Street & Smith's Sports Business Journal, p. 12 (Jul. 9, 2007).
Office Action dated Mar. 29, 2011, U.S. Appl. No. 12/946,739.
Office Action dated Apr. 13, 2010, U.S. Appl. No. 12/187,295.
Shulman, "VICS and Quick Response: Priority Issues for Mass Merchandisers", Supermarket Business, vol. 44, No. 10, p. 13(4) (Oct. 1989).
Weiner, "Are the Days Numbered for the Paper Ticket?", Street & Smith's Sports Business Journal, p. 17 (Jun. 18, 2007).
U.S. Appl. No. 14/202,218, First Action Interview—Office Action dated Jul. 28, 2014, 2 pages.
U.S. Appl. No. 14/202,218, Preinterview First Office Action dated Jun. 5, 2014, 5 pages.
Article from Website; Tech Web; "Byter Up: Ballparks Go High-Tech"; Mar. 31, 1999 (4 pages).
Article from Website; Sports Venue Technology; "Pacific Bell Park, San Francisco"; (5 pages).
Happel, et al.; "Creating a Futures Market for Maior Event Tickets: Problems and Prospects"; *Cato Journal*, vol. 21, No. 3; 2002 (pp. 443-461.

* cited by examiner

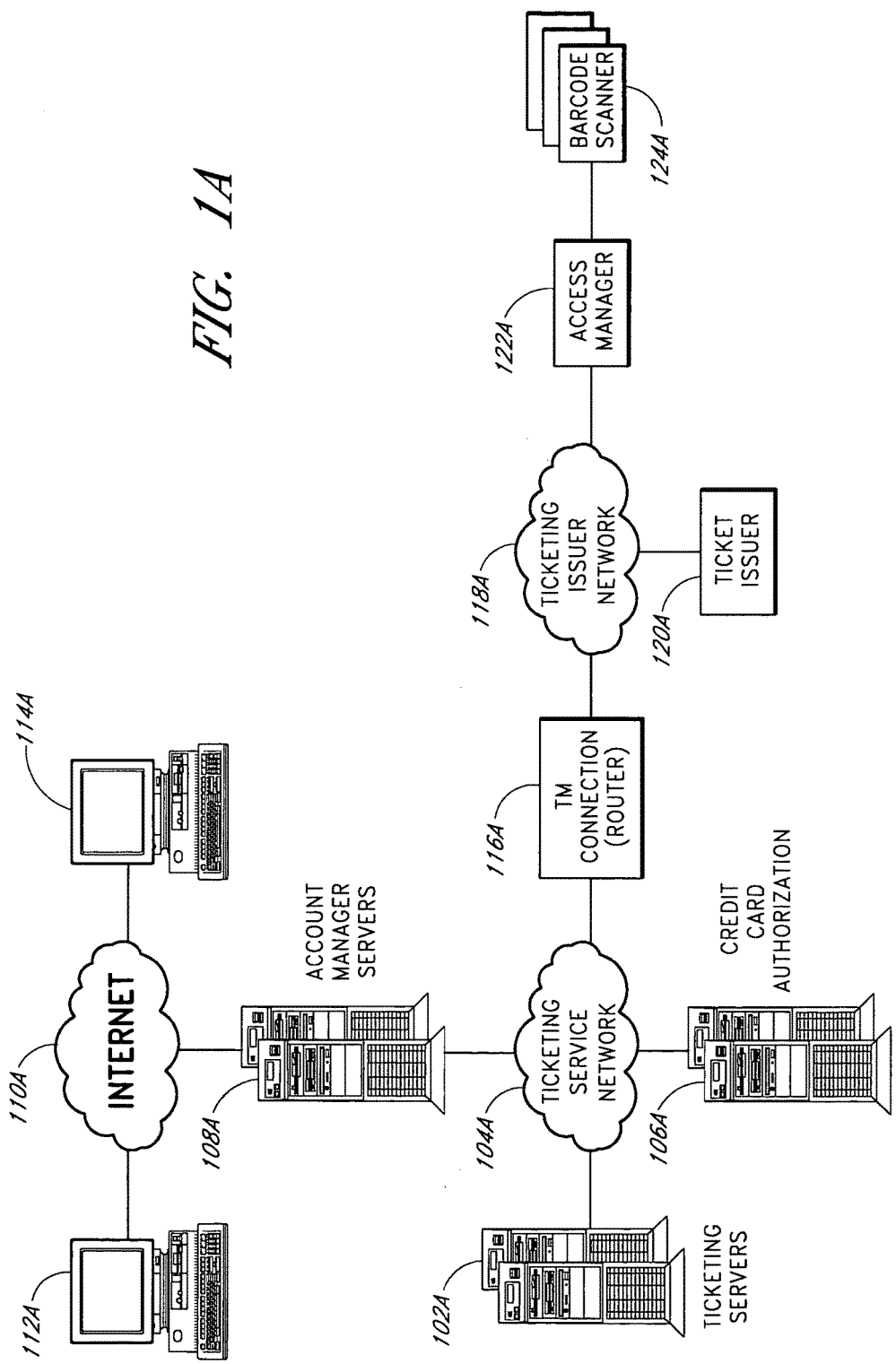

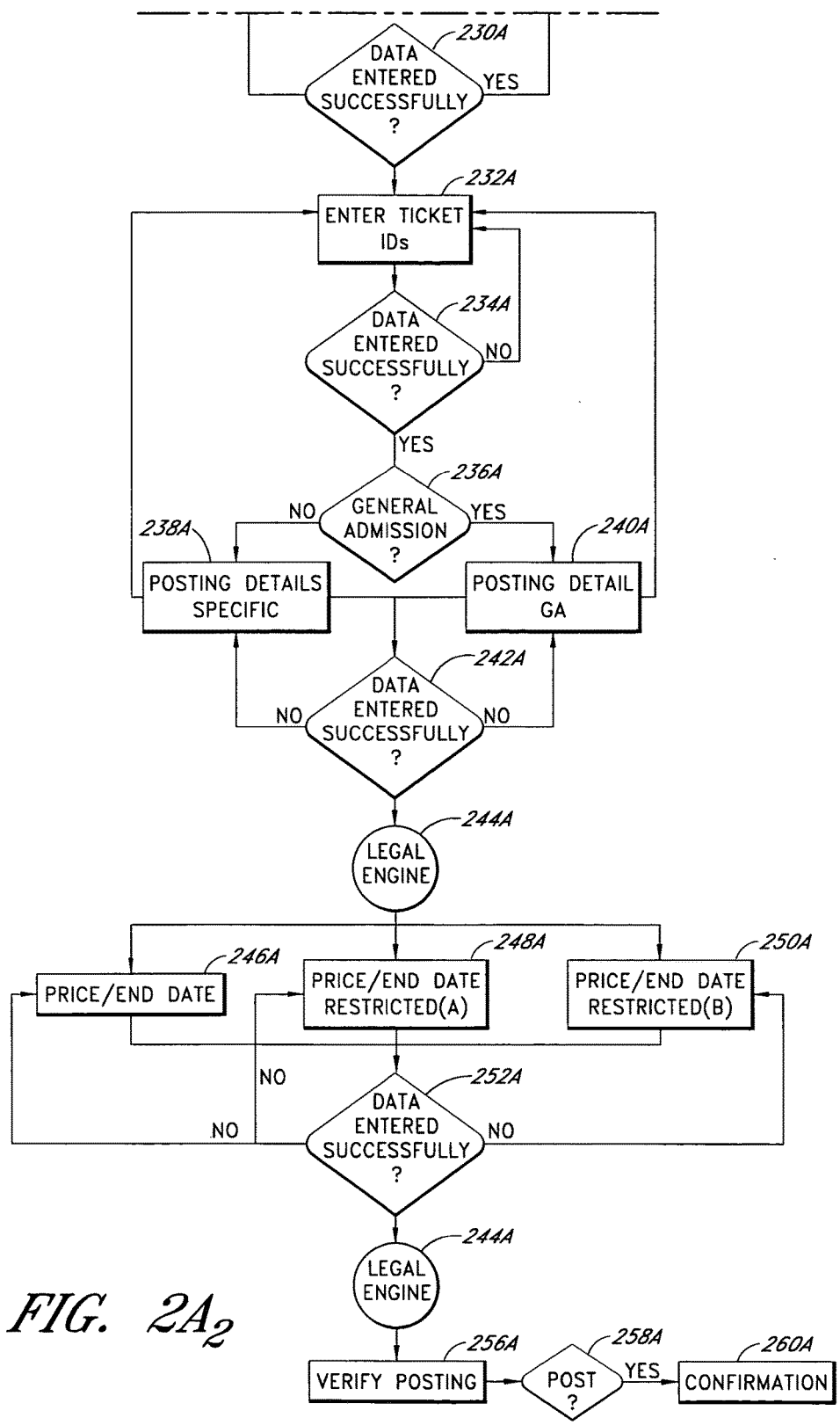
FIG. 2A₂ ticketmaster

Help   Check My Order   My Account   International home | concerts | sports | arts & theater | family | movies | ticketExchange All Ticketmaster Events ▼  Search ticketExchange | Where Fans BUY and Sell with Fans Los Angeles & Surrounding Areas change location

Elton John
STAPLES Center, Los Angeles, CA
Saturday, September 28, 2002 8:00PM Elton John - DVDs,
Incens, music & more!

Sell Tickets

O No dates scheduled in Los Angeles & Surrounding Areas.

/502B  /504B  /506B  /508B

O Showing 1 - 12 of 12 dates scheduled outside your area.

| | | | |
|---|---|---|---|
| Thu, 09/12/02 9:00 pm | Elton John | Jacksonville Coliseum Jacksonville, FL | Sell Tickets |
| Fri, 09/13/02 7:30 pm | Elton John and Billy Joel | St. Pete Times Forum Tampa, FL | Sell Tickets |
| Tue, 09/17/02 7:30 pm | Elton John and Billy Joel | Philips Arena Atlanta, GA | Sell Tickets |
| Fri, 09/20/02 7:30 pm | Elton John and Billy Joel | Fleetcenter Boston, MA | Sell Tickets |
| Mon, 09/23/02 7:30 pm | Billy Joel and Elton John | Madison Square Garden New York, NY | Sell Tickets |
| Wed, 09/25/02 7:30 pm | Billy Joel and Elton John | Nassau Coliseum Uniondale, NY | Sell Tickets |
| Fri, 09/27/02 7:30 pm | Billy Joel and Elton John | Nassau Coliseum Uniondale, NY | Sell Tickets |
| Wed, 10/02/02 7:30 pm | Billy Joel and Elton John | Continental Airlines Arena East Rutherford, NJ | Sell Tickets |
| Fri, 10/04/02 7:30 pm | Billy Joel and Elton John | Continental Airlines Arena East Rutherford, NJ | Sell Tickets |
| Tue, 10/08/02 7:30 pm | Billy Joel and Elton John | Continental Airlines Arena East Rutherford, NJ | Sell Tickets |
| Fri, 10/11/02 7:30 pm | Billy Joel and Elton John | Nassau Coliseum Uniondale, NY | Sell Tickets |
| Sun, 10/13/02 7:30 pm | Billy Joel and Elton John | Nassau Coliseum Uniondale, NY | Sell Tickets | home   concerts   sports   arts & theater   family
Help   Ticket FAQs   My Account   About Ticketmaster   Sell Tickets With Us   Our Policies   International

*FIG. 5B* ticketmaster help   Check My Order   My Account   International

*502C* — home | concerts | sports | arts & theater | family | ... | ticketExchange ticketExchange only | Search ticketExchange — Where Fans Buy and Sell with Fans

Elton John
STAPLES Center, Los Angeles, CA
Saturday, September 28, 2002 8:00PM Elton John - DVDs, sports, music & more links
- Post Tickets
- Back to Standard Ticketmaster Tickets top 5 buyer questions
- What is the difference between a regular ticket and ticketExchange ticket?
- Is it safe and legal to buy ticketExchange tickets?
- Do I pay the seller or Ticketmaster?
- How are my tickets delivered?
- Is there any guarantee that my tickets will arrive on time and be authentic?

tutorials
How to ticketExchange?
- Buyer's Tutorial
- Seller's Tutorial

Showing 20 of 57 listings

*504C* Tickets starting from $150.00 | *506C* seating chart | *508C* | *510C* | *512C* (1-20) next »

| Seats | Price/Ticket | Seller | Quantity | |
|---|---|---|---|---|
| Sec 7, Row 15 | $150.00 | mdainman | 4 | View Details |
| Sec 7, Row 16 | $155.00 | johnnyapple | 2 | View Details |
| Sec 15, Row 15 | $160.00 | mdainman | 10 | View Details |
| Sec 5, Row 1 | $170.00 | johnnyapple | 6 | View Details |
| Sec 15, Row 10 | $175.00 | mdainman | 5 | View Details |
| Sec 2, Row 1 | $180.00 | peterQ | 1 | View Details |
| Sec 7, Row 16 | $185.00 | johnnyapple | 2 | View Details |
| Sec 15, Row 15 | $190.00 | mdainman | 10 | View Details |
| Sec 5, Row 1 | $195.00 | johnnyapple | 6 | View Details |
| Sec 15, Row 10 | $200.00 | mdainman | 5 | View Details |
| Sec 2, Row 1 | $205.00 | peterQ | 1 | View Details |
| Sec 7, Row 16 | $210.00 | johnnyapple | 2 | View Details |
| Sec 15, Row 15 | $215.00 | mdainman | 10 | View Details |
| Sec 5, Row 1 | $220.00 | johnnyapple | 6 | View Details |
| Sec 15, Row 10 | $300.00 | mdainman | 5 | View Details |
| Sec 2, Row 1 | $312.00 | peterQ | 1 | View Details |
| Sec 15, Row 15 | $320.00 | mdainman | 10 | View Details |
| Sec 5, Row 1 | $330.00 | johnnyapple | 6 | View Details |
| Sec 15, Row 10 | $335.00 | mdainman | 5 | View Details |
| Sec 2, Row 1 | $340.00 | peterQ | 1 | View Details |

(1-20) next » home | concerts | sports | arts & theater | family
Help   Ticket FAQs   My Account   About Ticketmaster   Sell Tickets With Us   Our Policies   International

*FIG. 5C*

Accounting Home > Ticket Management > Post For Sale

ATTENTION: Once tickets are resold the original season tickets become invalid.
All credits for ticket sales will be applied to your season ticket account & refunds are only available upon termination of the season ticket account

Lakers vs Knicks

Thursday, July 1 2004, 8:00 PM
at STAPLES Center

Section 101, Row A  ← 602E

| Seats | Price Paid |
|-------|------------|
| 2 | $187.50 |

Set Posting Price

Must be between $187.50 and $5000.00

$ [ 800 ] per ticket  ← 604E

You will receive a credit for 100% of the posting price if your ticket sold.

Need help setting a positive price? Check the Los Angeles Lakers ticketExchange listings site to view other postings. Also, check the Los Angeles Lakers ticket prices for individual ticket price listings.

Enter Expiration Date

If tickets are not purchased by this date, they will be removed from the Los Angeles Lakers ticketExchange and returned to your account.

[July ▼] [01 ▼] [2004 ▼]  ← 606E

Note: All ticket sales will stop 4 hours before the event start time.

Cancel  ( Continue )

*FIG. 6E*

Accounting Home > Ticket Management > Ticket posting Verification

ATTENTION: Once tickets are resold the original season tickets become invalid. All credits for ticket sales will be applied to your season ticket account & refunds are only available upon termination of the season ticket account

Post Tickets – Verify Information

Please verify that the information is correct and click "Post Tickets for Sale" to complete your order.

Please note that if your ticket is sold, your original ticket is no longer valid. Do not discard your original ticket until we have notified you that it has been sold.

Event:

Lakers vs Knicks
Thursday, July 1, 2004, 8:00 PM
at STAPLES Center

Seats:

Section 101, Row A, Seat 2

Posting Price:

$800.00 per ticket     Edit Posting Price
$800.00 total

Note: You will receive a credit for $800.00, or 100% of the posting price if your ticket is sold.

Posting Expires:

July 1, 2004, 4:00 PM Pacific Time.
You will be notified at vlawor@la-lakers.com if your ticket has not sold by this time.

Please: Note:

By clicking the "Post Tickets for Sale" button, I agree to the terms of use.

( Post Tickets for Sale )

*FIG. 6F*

APPARATUS FOR ACCESS CONTROL AND PROCESSING

PRIORITY CLAIM

This application claims the benefit under 35 U.S.C. 119(e) of U.S. Provisional Application No. 60/431,865, filed Dec. 9, 2002, the contents of which are incorporated herein in their entirety.

BACKGROUND OF THE INVENTION

Field of the Invention

The present invention relates generally to access processing, and in particular to systems and methods for processing the transfer of access.

Description of the Related Art

Conventional methods of reselling tickets, such as for sporting or entertainment events, have many drawbacks. For example, some conventional methods involve purchasing tickets from individuals at a venue site, such as a stadium. Disadvantageously, potential purchasers are often unsure about the authenticity of the ticket and so do not purchase tickets in this manner. Another conventional approach involves purchasing tickets from a ticket broker. However, even using an honest broker does not ensure that the purchased ticket is valid or authentic. For example, the ticket broker may have purchased the ticket from an unreliable source. Still another conventional approach of transferring tickets involves auctioning the tickets online. However, once again there can be uncertainty as to the authenticity and validity of the tickets. Auction customers may also need to utilize a mechanism for the physical ticket transfer, such as the U.S. Post Office mail service or an overnight courier service, that can take one or more days to deliver the ticket, inhibiting the auctioning of tickets on the same day, or at a time near the date, of the event corresponding to the ticket.

The foregoing problems are further compounded if the ticket seller is holding an electronic ticket, that is, a ticket that was emailed and then printed. For example, the seller may have sold the ticket to multiple buyers, and then simply emailed them each a copy of the same ticket.

Further, using some conventional methods, there may not be any assurances that the ticket sale is legal, causing the buyer to be involved in an illegal transaction, and potentially invalidating or preventing the use of the ticket.

SUMMARY OF THE INVENTION

An example embodiment includes a networked ticketing apparatus, comprising: a first database including records that contain identifier codes associated with tickets; a first networkable server configured to receive a ticket posting instruction transmitted over a network from a first user terminal by a first user, wherein the ticket posting instruction includes at least a first code associated with a first ticket that had been previously provided to the first user, the first ticket for a first seat at a first event; and a first software module stored in computer readable memory, the first software module configured to post the ticket on a first networked computer resource, and to receive an order instruction from a second user, wherein the first software module invalidates the first ticket at least partly in response to the order instruction, and issues a second ticket to the second user for the same seat at the same event as the first ticket.

Another example embodiment includes a ticketing apparatus, comprising: a database of information on tickets previously sold to users that are being offered for resale by the users, the database including at least seating and price information for a first ticket of a first user; a search engine configured to receive a search request transmitted over a network from a terminal associated with a second user and to selectively transmit to the terminal information retrieved from the database, including at least the seating and price information for a first ticket; and at least a first computer instruction configured to receive an instruction from the second user, and at least partly in response to the first instruction, invalidate the first ticket of the first user and issue a second ticket to the second user for the same seat as that of the first ticket.

Still another example embodiment provides a networked ticket compliance apparatus, comprising: a first database including at least a first record of a first regulation related to ticket transfers; a first networkable server configured to receive a ticket posting instruction transmitted over a network from a first user terminal by a first user, wherein the ticket posting instruction includes a posting price associated with a first ticket; a second database record including location information for the first user; and a first software module stored in computer readable memory, the first software module configured to read the first database record and the first posting price and to determine whether the posting price complies with the first regulation, wherein the first software module prevents the posting of the first ticket based at least part on the first posting price failing to comply with the first regulation.

Yet another example embodiment provides a ticketing apparatus, comprising: a first database including records that contain identifier codes associated with tickets; a first networkable server configured to receive a ticket transfer instruction transmitted over a network from by a first user, wherein the ticket transfer instruction includes at least a first code associated with a first ticket that had been previously sold to the first user, wherein the first ticket is for a first event; and a first software module stored in computer readable memory, the first software module configured to cancel the first ticket and to issue a second ticket to the second user for the first event.

One example embodiment provides a method of transferring tickets, comprising: receiving at a computer system a posting instruction for a first ticket for a first event held by a first user; posting the first ticket on a website; and in response to a ticket purchase instruction by a second user, invalidating the first ticket and issuing another ticket to the second user for the event.

Another example embodiment provides a method of transferring tickets, comprising: providing a first user with a first ticket, wherein the first ticket is for a first seat for a first event; receiving at a computer system a first instruction to transfer at least admission rights associated with the first ticket to a first recipient; canceling the first ticket; and transmitting to the first recipient a second ticket for the first seat for the first event.

Still another example embodiment provides a method of posting tickets, comprising: receiving at a computer system a posting instruction for a first ticket held by a first user, wherein the posting instruction including a first posting price; determining if the first posting price complies with at least a first governmental regulation; and notifying the first user of a failure to comply at least partly in response to determining that the first posting price fails to comply with the at least first governmental regulation.

Yet another example embodiment provides a method of processing tickets, comprising: retrieving from a database at least a first record including information with respect to an original ticket holder for at least a first attendance right in the form of a ticket for a first event, the information including information related to the price paid for the first ticket by the original ticket holder, and information on a second holder of the first attendance right including information related to a price paid for the first attendance right by the second ticket holder; receiving an indication that the event is postponed and notifying the original ticket holder and the second holder of the postponement; and causing a refund of at least a first portion of the price paid by the second ticket holder to be provided to the second ticket holder; causing the first attendance right to be transferred back to the original ticket holder as a result of the postponement.

One example embodiment provides a method of processing tickets, comprising: retrieving from a database at least a first record including information with respect to an original ticket holder for at least a first attendance right for in the form of a ticket for a first event, the information including information related to the price paid for the first ticket by the original ticket holder, and providing information on a second holder of the first attendance right including information related to a price paid for the first attendance right by the second ticket holder; receiving an indication that the event is cancelled and notifying the original ticket holder and the second holder of the cancellation; causing a refund of at least a first portion of the price paid by the second ticket holder to be provided to the second ticket holder; and causing the original ticket holder to pay for at least a second portion of the price paid by the second ticket holder.

Thus, in an example embodiment, a ticket system enables users to verify the validity of tickets, to transfer or sell tickets to other users, and to buy tickets from other users. By way of example, the tickets can be used to gain access to events, for travel, for other goods or services. Thus, purchasers can buy tickets on the secondary ticket market with similar confidence as in the primary ticket market. The ticketing system can deliver, or trigger the delivery of tickets to a buyer of tickets being resold. In addition, once the ticket is resold, the system can cancel the original tickets and reissue tickets with a different code to the purchaser. Advantageously, the ticket seller can remain anonymous with respect to the buyer. Optionally, once the seller posts a ticket for sale on a networked computer, the seller does not have to take further action in order for the sale to the buyer to be completed.

BRIEF DESCRIPTION OF THE DRAWINGS

Embodiments of the present invention will be described with reference to the drawings summarized below. These drawings and the associated description are provided to illustrate example embodiments of the invention, and not to limit the scope of the invention.

FIGS. 1A-B illustrate example networked ticketing systems that can be used in accordance with example embodiments of the present invention.

FIGS. 5A-D illustrate example ticket-related user interfaces.

FIGS. 6A-F illustrate additional example ticket-related user interfaces.

Throughout the drawings, like reference numbers are used to refer to items that are identical or functionally similar.

DETAILED DESCRIPTION OF PREFERRED EMBODIMENTS

Figure 1B:
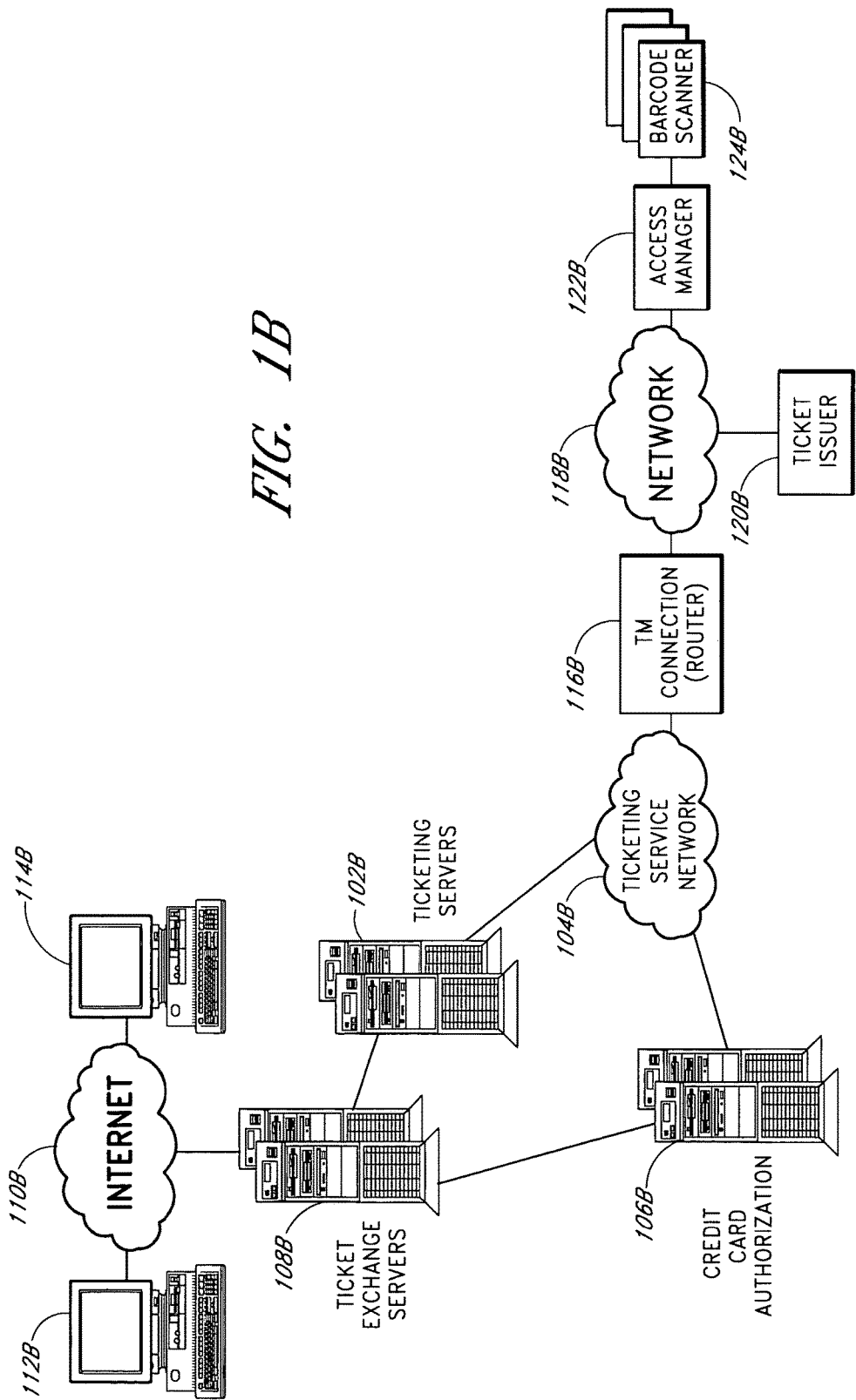

The present invention provides systems and methods for ticket processing. As will be described in greater detail below, in one embodiment, a ticket system enables users to verify the validity of tickets, to transfer or sell tickets to other users in a secondary market, or to buy tickets from other users. By way of example, the tickets are redeemable or good for entry or access to events, for travel, for other goods or services, or for money (each, a "Ticketed Item/Event"). Thus, purchasers can buy tickets on the secondary ticket market with similar confidence as in the primary ticket market.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits. In addition, the example processes described herein do not necessarily have to be performed in the described sequence, and not all states have to be reached or performed.

Further, while the term "barcodes" and "barcode scanning" may be utilized herein as examples of information and identification encoding and retrieval techniques, other information bearing techniques and corresponding scanning or reading techniques can be used as well. For example, magnetic stripes, human readable codes, non-volatile memory, smart chips, and/or the like can be used to store information, including identification information, seat information, event information, ticket holder information, ticket issuer information, and the like.

Further, while the following description may refer to "clicking on" a link or button, or pressing a key in order to provide a command or make a selection, the commands or selections can also be made using other input techniques, such as using voice input, pen input, mousing or hovering over an input area, and/or the like. Further, the term "button" as referred to herein can include both software generated buttons displayed on a screen and physical keyboard buttons, as appropriate.

One example system allows a user who has previously obtained one or more tickets directly or indirectly from another seller to selectively post or offer those tickets for sale over an electronic system. Optionally, the system provides the seller over a computer network an electronic form displayed via a web page. For example, the form can be generated using HTML, Java, XML, and/or other rendering software. The form receives from the seller characters or other codes to identify the tickets to be sold. The tickets are posted on a Web site host by the system or optionally on another system. Potential buyers can then access the networked system via a client terminal to view information, such as price and/or seat location, related to tickets posted for sale by this or other sellers, and to selectively make ticket purchases via the system. If a buyer purchases tickets, then the system cancels the seller's tickets and will issue new tickets [electronic or physical] to the buyer. The system operator or affiliate can optionally guarantee the sale and/or purchase of a ticket.

Optionally, the system can restrict the types of tickets that will be posted. For example, the system can prevent the posting of tickets without barcodes, of tickets for certain events for which information is not available in a system database, and the like.

As part of the purchase process, the system can accept payment from the buyer and then remit the payment, or a portion thereof, to the seller. The system can deduct a portion of the payment as compensation to the system operator, affiliate thereof, a venue, service provider, and/or performer/sports team. Alternatively or in addition, the seller can be charged a fee upon posting the ticket for sale. The buyer can be charged a processing fee and/or a percentage of the purchase price as well. For example a user can be charged 10% of the posting price for the ticket upon sale of the ticket. Optionally, payment for the purchase of the ticket to the seller is not remitted to the seller until the seller returns the seller's original ticket to the system or system operator.

The system can deliver, or trigger the delivery of the tickets to the buyer. In addition, the system or system operator can accept the cancelled tickets from the seller to take them out of circulation. The system can store in a user account database bank account, credit card, and other payment and financial information to pre-authorize buyers and sellers, and to facilitate payment.

One ticket delivery option that can be used by the system is electronic delivery. By way of example, electronic delivery can send or deliver a ticket, or a manifestation of a ticket (which, will also be referred to as a "ticket"), (a) inside an email, (b) as an attachment to an email, (c) as a download from a web site, or (d) otherwise. The user can then print the electronic ticket for use at a venue, or the corresponding information can be transmitted to the venue's ticketing apparatus so that an operator can retrieve the ticket information. The system can track when the delivery is sent, received or accepted and store such information in the system database. Optionally or in addition, the ticket can be mailed as a physical ticket via the postal service, courier service, or otherwise.

The system can apply rules that require certain information to be solicited or displayed, or that prohibit, or restrict certain aspects of certain transactions, including, but not limited to, prices offered, prices paid, quantities of tickets offered, quantities of tickets purchased, generally or with respect to types, characteristics, timing or locations of the seller, buyer or Ticketed Item/Event or transactions related thereto. Such rules may be based on business or legal objectives, requirements, considerations or concerns, which may include, without limitation, global, federal, state, city, regional or local laws, fraud or system abuse parameters, transaction volume, or number of sales in a given period parameters.

The system can deliver messages, via a web page, email, or a dialog interface, to users indicating when rules are violated. These rules can be selectively turned on and off, and can otherwise be modified, by the system's administrators.

The system optionally allows transactions to happen anonymously so that buyers and sellers are not required to meet or to work directly with each other, or be able to personally identify each other outside of the context of the transaction wherein the system provides certain information, in the form of a code or the like, identifying the buyer or seller. Optionally, the system can post selected information about the buyer or seller if so required by state or local regulations. When such is the case, the buyer and/or seller will be notified that such posting will take place.

The system is optionally integrated into an overall ticket inventory management system, which can track each purchase and sale, as well as the identities of the seller and the buyer, prices paid, quantities ordered, and delivery information. Information regarding the foregoing can be stored in the system database and accessed as needed to perform the processing described herein. The inventory system also provides for customer service-based locking of seats, reissuing of tickets, and the transfer of seats between the secondary and primary markets.

The system can maintain a database record of the full history of the ticket, including the original ticket issuance and ticket transfers for a seat at a given event. The ticket history can enable the detection of the use of counterfeit tickets for the seat and can aid venue staff members to resolve conflicts with respect to two or more users both holding tickets for the same seat at the same event. For example, if the ticket history indicates that a presenting user was the last purchaser or recipient of the ticket, then that presenting user can be granted use of the seat for the event, while other presenting users can be denied use of the seat for the event.

The administrator or operator of a Ticketed Item/Event (which may include, but not be limited to, a person at a venue location, a point of redemption, or an origin point of travel) can be informed of a change in holder or other status of the ticket via a message transmitted by the system over a computer network to a computer system associated with the administrator or Ticketed Item/Event.

With respect to sales and purchases, the system allows money to be electronically deposited or credited into, or charged or withdrawn against, users' bank, credit or other payment or financial institution accounts, customer credit account for purchasing additional tickets, whether the user is a buyer or a seller, and whether the ticket, or transaction involving the ticket, is being purchased, refunded, reversed, returned, or the Ticketed Item/Event is being cancelled or postponed.

If a person attempts to purchase a ticket from the primary market, such as an unsold ticket held by the ticket issuer or its agent, and the system determines that there are no remaining primary market tickets for an event or for a desired seating area for the event, the system can transmit to the person, via a Web page, email, or the like, a link to, or a referral to a Web page that lists previously sold tickets held by other users that are now offered for sale in the secondary market.

If a person is trying to purchase a ticket to a Ticketed Item/Event from the original issuer of such ticket, then before, during or after such purchase process, the system will allow the user, via a user interface such as a web page displayed on a user terminal being used to access the system, (a) to check whether another ticket for the same Ticketed Item/Event is posted for sale, and then to purchase such other ticket, or (b) to check whether the ticket can be posted for sale over the system, and then allow such ticket to be posted and sold.

The system is accessible by another purchasing ticket platform so that such other platform can check the system for tickets that are available for purchase or Ticketed Items/Events for which tickets can be sold, and then allow purchases and sales to be made through such other platform that are fulfilled through the system.

The system can divide up a payment made by a buyer or a seller and remit parts of it to different parties or different accounts, in situations which may include, but not be limited to, the sale, refund, reversal or return of a ticket or the postponement or cancellation of a Ticketed Item/Event.

Users can access the system to review past account activity and to modify or manage their accounts or their ticket sale postings, which they can modify or terminate. For example, users can access the system to review the status of their ticketing transactions, including checking on event cancellations and postponements, shipping information and receipt of sold ticket information. Users can also access the system to change asking prices for tickets, to remove tickets from sale, or to set sale deadlines.

Optionally, a user can be required to register with the system before being allowed to post a ticket for sale. As part of the registration process, the user may be requested to provide the user's name, mailing address, email address, season ticket holder account information, billing address, phone number, and a form of payment. If the form of payment is a credit card, the user can be further asked to provide the card expiration address. In addition, the user may be requested to provide checking or bank account information corresponding to the account in which payment is to be deposited for the sale of tickets by the user. The account information can also be used for identity verification. The credit card or checking account information can also be used to collect payment from the user if the user sold tickets for an event, and the event is then cancelled. The payment can then be remitted to the purchaser of the ticket from the seller. The user may be asked if the user is a licensed broker, and if so, can be asked to supply the company name and license number.

A user can request that the system send the user alerts notifying the user when certain types of tickets are purchased or sold by others and the prices for which they are sold or purchased, and other details related to any sale or purchase. The system will then provide such alerts or notification. The alert or notification can be transmitted via email, a phone call, an instant messaging service, and the like.

The system can retrieve average price asked, average price paid, and other metrics, related to different types of ticketing selling or offering activity through the system and can provide such information to users. The system can also suggest market prices for tickets based on past activity for similar tickets.

The system can allow potential buyers to list, and then post listings of tickets, or information about tickets, that they are interested in buying, and desired purchase prices and/or quantities relating to such tickets. The system can allow potential buyers to post standing offers to buy tickets that potential sellers can review and then accept, which will cause the sale and delivery process described herein to occur.

The system can send alerts to users that other users have posted certain types of tickets for sale, or have indicated that they are interested in buying, or will have offered to buy, certain types of tickets, along with information about such offered, or desired, tickets, which may include ticket descriptions or desired sales prices or quantities.

The system can allow potential buyers or sellers to change the price offered either manually by logging in to modify their postings each time that they want to make price offer modifications, or automatically by entering data about frequencies and amounts of desired price increases or decreases.

The system can provide users with data about sellers, such as past sales and offering activity, which may include how many tickets a particular seller has sold in the past, information about said tickets, and prices charged or asked for said tickets. In addition, the system can generate or provide ratings of sellers based on past activity. The system can provide users with data about buyers, such as past purchases and offering activity, which may include how many tickets a particular purchaser has purchased in the past, information about said tickets, and prices charged or asked for said tickets and can generate or provide ratings of purchasers based on past activity.

The system searches or sorts data stored in a database and/or dynamically generated, in response to user search and/or sort queries transmitted from a user terminal over a network to the system, and transmits the located information to the user terminal. For example, in response to user requests transmitted over a network to the system, the system searches or sorts seller, buyer, ticket or event listings by categories of tickets, based on other information pertaining to tickets, categories, ratings or other information pertaining to sellers or potential buyers. The search request, search, and search result reporting can be performed during the process of trying to sell a ticket, trying to buy a ticket, or while the user is browsing events and tickets on a web site hosted by the system.

In order to ensure that valid tickets are being sold or resold, the system verifies whether a ticket that a user is trying to sell has in fact been previously issued or is still valid, and verifies the accuracy of a unique code or number assigned to each ticket. For example, the code can be a unique 12 or 16 digit barcode number. The verification can be performed by comparing the code of the ticket being sold to codes stored in the system's database or a database connected with the system. This unique code can be used by the seller to post the ticket for sale, as described below.

Advantageously, via the system, ticket holders (the "Sender") can electronically transfer a ticket to another person (the "Recipient"). This can be done by the Sender providing to the system identifying information relating to the ticket and the Recipient's email address, user id, password, or other information identifying the Recipient. The Sender, or the system, then communicates to the Recipient that the Sender is trying to, or is forwarding a ticket, including associated admission rights or authorizations, to the Recipient. The communication can include a system-generated new ticket to the Recipient with a barcode identifier, information about where the Recipient may retrieve a new ticket, and/or information that can be used to gain access to the event, such as a code that can be used to gain admission. The system can then cancel the ticket held by the Sender either (a) when the Sender instructs the system to transfer the ticket or (b) when the Recipient retrieves the new ticket from either the communication or from another retrieval place where he retrieves it. Such other place may include a web site. The Recipient, in turn, can optionally be allowed to resell or forward the ticket, and so also be a Sender. However, the Recipient can instead be prohibited from reselling or forwarding the ticket. Advantageously, the system can keep a record of each transaction so that the system can track who the current ticket holder is, as well as who has previously held the ticket.

The system can be accessed by a person so that that person can verify via data retrieved from the system database, whether a ticket, or physical, electronic or other manifestation of a ticket, is still valid for a corresponding ticketed item or event, or whether that ticket (or physical, electronic or other manifestation thereof) has been cancelled or is otherwise no longer valid.

By way of example, the cancellation of the Sender's ticket can be performed by storing a cancellation or invalidation indication in system database in association with the unique code associated with the original ticket, or by removing a reference to the Sender's ticket in the system database. Then, if the Sender or someone else attempts to use the Sender's ticket, the ticket can be scanned via a scanner at the point of attempted use, and the scanned code can be transmitted over a network to the system via a local terminal coupled to the scanner. For example, the code can be printed on a physical ticket as a barcode, and scanned via an optical barcode scanner. Similarly, the code can be stored on a magnetic strip or band on the ticket and scanned using a magnetic strip scanner. The code can then be compared by the system with information stored in the system database, the ticket can be identified or characterized as invalid and/or cancelled, and the characterization can be transmitted to the terminal, at which time the terminal operator can read the characterization and deny the holder of the Sender's ticket the corresponding ticket service, such as admission to a particular event for which the ticket was issued.

The system can apply rules that require certain information to be solicited or displayed, or that prohibit, or restrict certain aspects of certain transactions, including, but not limited to, prices offered, prices paid, quantities of tickets offered, quantities of tickets purchased, generally or with respect to types, characteristics, timing or locations of the seller, buyer or Ticketed Item/Event or transactions related thereto. Such rules may be based on business or legal objectives, requirements, considerations or concerns, which may include, without limitation, global, federal, state, city, regional or local laws, fraud or system abuse parameters, transaction volume, or number of sales in a given period.

For example, some states or localities have regulations, such as anti-scalping regulations, that control or regulate the sale, resale, and purchase of tickets. Optionally, each offer for resell of a ticket can be analyzed by a legal engine to determine whether the resell is in compliance with state or local regulations of the reseller, the buyer, venue, and/or where the system or system operator are located. For example, the seller or Sender can be asked to supply information regarding his or her residence, such as the city, state, and/or zip code of the residence. Similarly, the buyer or the Receiver can be asked to supply information regarding his or her residence, such as the city, state, and/or zip code of the residence.

When a seller attempts to post a ticket for sale, or when a buyer makes a purchase request, the system's legal engine can then access one or more database records corresponding to that state and/or locality of seller, buyer, and/or venue. The one or more database records can include an indication as to whether the resell of tickets is permitted by individuals and/or other entity-type in the state or locality, whether there is a limit on the amount over ticket face value that can be charged and/or whether there is a limit on the number of tickets an individual, or other specified entity, can sell within a specified period or for a given event.

If a particular sale is prohibited under the regulations of the residence of the seller and/or venue, then the system notifies the prospective seller that the posting of the ticket for sale will not be accepted. If the sale is prohibited because the seller was asking too high a price, the seller is notified by the system of the prohibition reason, and is informed of the maximum price or premium that the seller can charge for the ticket. Similarly, if the sale is prohibited because the seller was selling too great a quantity of tickets, the seller is notified by the system of the prohibition reason, and is informed of the maximum number of tickets the seller can sell or post at this time. If the sale of a ticket is prohibited based on the location of a prospective buyer, then in response to the prospective buyer making a purchase request, the buyer can be notified that the purchase request will not be accepted.

Should an event or service corresponding to a ticket be cancelled or postponed, optionally both the seller and buyer is notified via mail, email, phone, and/or the like. If there was more than one seller who held the ticket at some point, optionally each seller is provided with a notification. In the case of a cancellation, a refund of the ticket price will be provided to the buyer. Associated processing charges, commissions, convenience charges, and/or shipping charges, can optionally be refunded as well, or they may be retained by the system operator, ticket issuer, or related entities. Proceeds paid by the recipient to the seller for the ticket may be collected from the seller in order to pay for the refund to the buyer. The original ticket price paid by the original seller can optionally be collected from the original issuer of the ticket, such as a sport team, a concert promoter, a venue, or the like, and this amount can be paid to the original seller. Alternatively, if the original seller had paid for the ticket via credit card, the charge can be cancelled.

If ticket was resold several times, then in the event a refund is due, in one example process, the refund of the ticket price paid by the last recipient will be provided to the final buyer using funds from the last seller. Similarly, the last seller will be provided with a refund for the ticket price paid by the last seller using funds from the previous seller who sold the ticket to the last seller. The refund process continues until the first seller/buyer is reached, wherein the refund will be collected from the original issuer of the ticket as previously described. Optionally, to the extent the seller charged the purchase of the tickets to a credit card, the charge can be cancelled or reversed instead.

In one embodiment, if a seller sells a ticket to a buyer for an event that is cancelled, then the seller can be obligated to return to the buyer, through the system, the excess, if any, of the amount of payments the seller collected in connection with such sale over the amount of money that the ticket issuer would have refunded or credited to the seller had the seller been the holder of such ticket when the event was cancelled. The ticket issuer will refund the face value of the ticket to the buyer holding the ticket for the cancelled event. The return payment from the seller may be performed by charging the seller's credit card or by having the seller send in a payment within a specified time period, such as 5 days.

If an event is cancelled before the seller has resold the ticket, the system can remove the post to prevent another user from attempting to purchase the ticket.

Optionally, if a seller sells a ticket to a buyer for an event that is postponed and the buyer of such ticket is given a refund of the amount that the seller paid for the ticket, then the seller will be obligated to return to the buyer, through the service, the difference between the amount of payments the seller collected in connection with such sale and the amount of money the seller initially paid to purchase such ticket. The ticket issuer will return or reissue the ticket to the seller so that the seller can then use the returned or reissued ticket to attend the event. The seller can selectively be permitted to or prohibited from posting or forwarding the reissued ticket. The return payment from the seller may be performed by charging the seller's credit card or by having the seller send in a payment within a specified time period, such as 5 days.

Optionally, if the event is rescheduled, rather than providing a refund, the system can determine who is the last Recipient and issue a new ticket to the last Recipient for the new date and/or venue, while canceling the old ticket.

In addition, the system optionally performs fraud detection and avoidance to further enhance transaction security. Optionally, before posting a ticket, the seller can be required to submit a ticket identifier or code which can be printed or stored on the ticket. If the code fails to match with a ticket identifier stored in the system database, or appears to be an improper code, the posting can be refused as the ticket failed to be verified as authentic. In order to ensure that the seller was indeed a valid ticket holder, to receive payment the seller can be required to mail or return the original ticket purchased by the seller, as well as an optional signed and completed remittance form acknowledging the sale of the ticket. If the seller had originally received the ticket electronically, the user may optionally be required to provide a printout of the electronic ticket, or a copy thereof. If it is determined that a seller is attempting fraud, the seller can be prevented from posting and/or buying tickets in the future.

The buyer can also be subject to fraud detection. For example, if the buyer is using a credit card to make a purchase, the credit card can be verified before completing the sale, and the system can then reissue the ticket to the seller if the seller's ticket had been cancelled. If it is determined that a buyer is attempting fraud, the buyer can be prevented from posting and/or buying tickets in the future.

Optionally, other ticket brokers, as well as other specified entities, can be selectively prohibited or prevented from using some or all of the site functionality. For example, other ticket brokers can be prevented from buying and/or posting tickets using the system.

One embodiment of the ticket system will now be described with reference to the figures. Throughout the following description, reference will be made to various implementation-specific details, including, for example, process flows, protocol standards, and forms used for requesting and offering tickets. These details are provided in order to set forth preferred embodiments of the invention, and not to limit the scope of the invention.

FIG. 1A illustrates example hardware components and software components that can be invoked during the processes described herein. An example ticketing system operated by a ticket processing service or other entity can include ticketing servers 102A, account manager servers 108A, a credit card authorization system 106A, a network, 104A, and a router 116A. The ticketing system can host a Web site accessible by users for purchasing, selling, and transferring tickets. The Web site may optionally include content that spans multiple Internet domains, and/or may be implemented using physical servers that are geographically remote from one another. A legal engine resides on one or more of the foregoing systems to ensure that ticket postings and sales comply with applicable governmental or other regulations.

As depicted, users access the ticket processor ticketing system over the Internet 110A using respective PCs 112A, 114A. In addition or alternatively, users can access the ticketing system via other general-purpose computers that have access to the Internet, via networked personal digital assistants, phones, interactive televisions, or other user terminal types. The user terminals 112A, 114A may run commercially-available Web browser applications, such as those which implement the basic World Wide Web standards such as HTTP and HTML, or other types of applications that access data from networked sites.

The user terminals 112A, 114A may also run a commercially available e-mail application, such as Microsoft Outlook®, which may be used to receive communications from the ticketing system. The e-mail application and the browser may be integrated with one another, and/or may be integrated with other application programs or the operating system. The terminals 112A, 114A can include displays, keyboards, memory storage devices, printers, and the like.

The ticket processing ticketing system can include one or more databases, such as a user account database, that stores user contact information, billing information, preferences, account status, and the like, that can be accessed by other portions of the ticketing system, such as by account manager servers 108A. Similarly, one or more ticket databases accessible by the ticketing system can include ticket information records for tickets, including barcode information, event name, event date, seat identifier, ticket holder name or other identifier of a current ticket holder, names or other identifiers of past holders of the ticket, a ticket valid/invalid indicator, and an indicator that as to whether the ticket has been used.

As further depicted by FIG. 1A, a ticket issuer, which can be a sports team, venue operator, ticketing agency, or the like, accesses the ticketing system via the router 116A. The ticket issuer can have a ticket issuer ticket system 120A that hosts an application, such as Ticketmaster's commercially available Archtics™ application, that is used to define events, set ticket prices, and provide real-time integration with the ticket processor ticketing system. In addition, via the system 120A, the ticket issuer can optionally define customized invoices, tickets, receipts, labels, and other correspondence. The system 120A optionally allows the ticket issuer to define at least portions of the Web pages that will be displayed to users, such as by defining logos, fonts, colors, and the like.

The system 120A is connected to an intranet and/or the Internet 118A to thereby access the router 116A, access management system 122A, and to receive data from a barcode scanner 124A. The access management system 122A, an example of which is the server-based Access Manager™ system that is commercially available from Ticketmaster, is used to authenticate tickets proffered at an event venue. The access management system 122A can optionally generate reports tracking attendance, entry traffic by time, intervals, rejected admission attempts, and admissions by entry point, ticket type and/or price code when applicable.

The access management system 122A utilizes the barcode information scanned from a ticket using the scanner 124A to perform the authentication. The access management system servers can optionally use a database and/or an encryption/decryption algorithm for ticket identification lookup.

By way of example, the ticket issuer ticketing system 120A generates ticket barcodes. Optionally, each event/seat/print-count combination is associated with a unique barcode. A print count is the number of times tickets for an individual seat location that has been issued.

The ticket issuer then sells tickets, such as season tickets, to a first user, either directly or via the ticketing service ticket processing system. For example, the first user can initiate and complete the purchase via the user terminal 114A and can further authorize payment via a credit card, debit charge, or otherwise. The first user can then use the terminal 114A to post, via the account manager 108A, one or more of the season tickets for sale on the Web site hosted by the ticketing system. A record of the posting can be stored in the ticket database, which can be stored on the ticketing system 120A, the account manager servers 108A, and/or the ticketing servers 102A.

A second user can initiate, authorize payment, and complete a purchase of one or more of the posted tickets via the user terminal 112A. If the second user is paying by credit card, the credit card authorization system 106A checks to make sure the credit card is authorized and has not exceeded its credit limit. The ticketing system 120A invalidates the first user's ticket for which access rights have been purchased by the second user. An invalidation indicator is stored in association with the barcode information in the ticketing system database, as well as in a database associated with the access management system 122A. Thus, if someone tries to use the original, first user's ticket to access the corresponding event or game, the original ticket's barcode will be scanned using the barcode scanner 124A. The access management system 122A will compare the scanned barcode information with that stored in the access management system database, and via the invalidation indication determine that the ticket has been invalidated or cancelled. The holder of the original ticket can then be denied entry to the event.

Optionally, two or more of the ticketing servers 102A, account manager servers 108A, credit card authorization system 106A, ticketing system 120A, and access management system 122A can be co-located and/or hosted by the same computer system.

FIG. 1B illustrates another embodiment of example hardware components and software components that can be invoked during the processes described herein. An example ticketing system operated by a ticket processing service or other entity can include ticketing servers 102B, ticket exchange servers 108B, a credit card authorization system 106B, a network, 104B, and a router 116B. As depicted, in this embodiment the ticket exchange servers are connected directly to the ticketing servers 102B and the credit card authorization servers 106B. A legal engine resides on one or more of the foregoing systems to ensure that ticket postings and sales comply with applicable governmental or other regulations.

As similarly discussed above with respect to FIG. 1A, the ticketing system illustrated in FIG. 1B can host a Web site accessible by users for purchasing, selling, and transferring tickets. The Web site may optionally include content that spans multiple Internet domains, and/or may be implemented using physical servers that are geographically remote from one another.

As depicted, users access the ticket processor ticketing system over the Internet 110B using respective PCs 112B, 114B. In addition or alternatively, users can access the ticketing system via other general-purpose computers that have access to the Internet, via networked personal digital assistants, phones, interactive televisions, or other user terminal types. The user terminals 112B, 114B may run commercially-available Web browser applications, such as those which implement the basic World Wide Web standards such as HTTP and HTML, or other types of applications that access data from networked sites.

The user terminals 112B, 114B may also run a commercially available e-mail application, such as Microsoft Outlook®, which may be used to receive communications from the ticketing system. The e-mail application and the browser may be integrated with one another, and/or may be integrated with other application programs or the operating system. The terminals 112B, 114B can include displays, keyboards, memory storage devices, printers, and the like.

The ticket processing ticketing system can include one or more databases, such as a user account database, that stores user contact information, billing information, preferences, account status, and the like, that can be accessed by other portions of the ticketing system, such as by ticket exchange servers 108B. Similarly, one or more ticket databases accessible by the ticketing system can include ticket information records for tickets, including barcode information, event name, event date, seat identifier, ticket holder name or other identifier of a current ticket holder, names or other identifiers of past holders of the ticket, a ticket valid/invalid indicator, and an indicator that as to whether the ticket has been used.

As further depicted by FIG. 1B, a ticket issuer, which can be a venue operator, an artist, a promoter, a ticketing agency, a user reselling tickets, or the like, accesses the ticketing system via the router 116B.

The system 120B is connected to an intranet and/or the Internet 118B to thereby access the router 116B, access management system 122B, and to receive data from a barcode scanner 124B. The access management system 122B, an example of which is the server-based Access Manager™ system that is commercially available from Ticketmaster, is used to authenticate tickets proffered at an event venue. The access management system 122B can optionally generate reports tracking attendance, entry traffic by time, intervals, rejected admission attempts, and admissions by entry point, ticket type and/or price code when applicable.

The access management system 122B utilizes the barcode information scanned from a ticket using the scanner 124B to perform the authentication. The access management system servers can optionally use a database and/or an encryption/decryption algorithm for ticket identification lookup.

By way of example, in the case of a user reselling tickets, the ticket issuer ticketing system 120B can be a user computer executing a browser and used to post tickets. If the ticket issuer is the original ticket issuer, such as a venue operator, artist, or promoter, the system 120B can be used to generate ticket barcodes. If the system 120B is associated with the original ticket issuer, optionally, each event/seat/print-count combination is associated with a unique barcode. A print count is the number of times tickets for an individual seat location that has been issued.

The ticket issuer then sells tickets via the ticketing service ticket processing system to a first user. For example, the first user can initiate and complete the purchase via the user terminal 114B and can further authorize payment via a credit card, debit charge, or otherwise. The first user can then use the terminal 114B to post, via the ticket exchange 108B, one or more of the season tickets for sale on the Web site hosted by the ticketing system. A record of the posting can be stored in the ticket database, which can be stored on the ticketing system 120B, the ticket exchange servers 108B, and/or the ticketing servers 102B.

A second user can initiate, authorize payment, and complete a purchase of one or more of the posted tickets via the user terminal 112B. If the second user is paying by credit card, the credit card authorization system 106B checks to make sure the credit card is authorized and has not exceeded its credit limit. The ticket exchange servers 108B invalidate the first user's ticket for which access rights have been purchased by the second user. An invalidation indicator is stored in association with the barcode information in the ticketing system database, and optionally in a database associated with the access management system 122B. Thus, if someone tries to use the original, first user's ticket to access the corresponding event or game, the original ticket's barcode will be scanned using the barcode scanner 124B. The access management system 122B will compare the scanned barcode information with that stored in the access management system database, and via the invalidation indication determine that the ticket has been invalidated or cancelled. The holder of the original ticket can then be denied entry to the event.

Optionally, two or more of the ticketing servers 102B, ticket exchange servers 108B, credit card authorization system 106B, ticketing system 120B, and access management system 122B can be co-located and/or hosted by the same computer system.

Figure 2A:
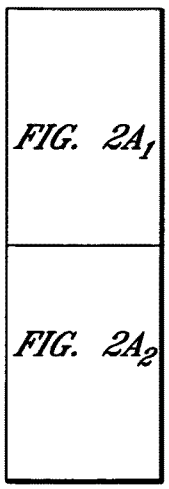
FIGS. 2A-2C illustrate example processes of posting and transferring tickets.
Figure 2A:
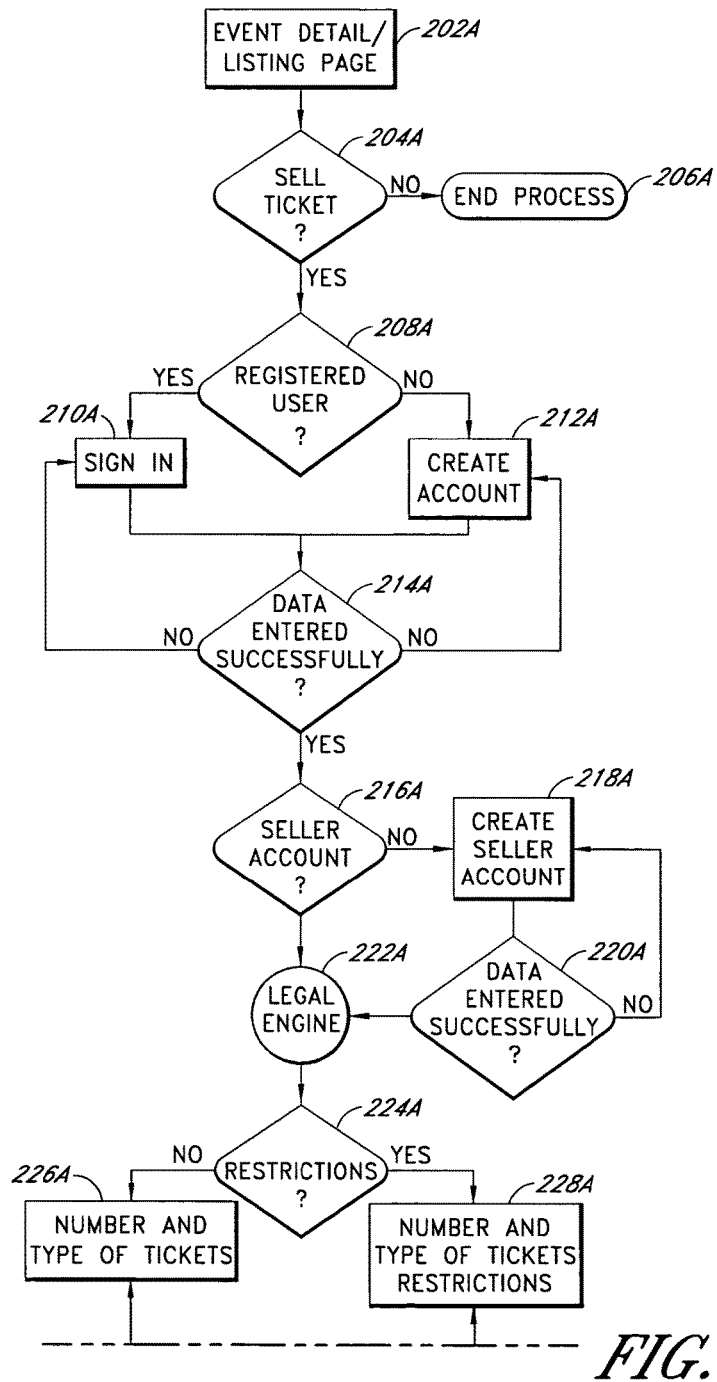

FIG. 2A illustrates one embodiment of a process for posting a ticket for sale utilizing one of embodiments discussed above. At state 202A, a user accesses an event detail page via a terminal. At state 204A, the user is asked whether the user wants to post a ticket. If the user does not want to post a ticket, the process ends at state 206A. If the user does want to post a ticket, indicated by clicking on a corresponding button or link, the process proceeds to state 208, where the user is asked whether the user is a registered user of the ticketing system. If the user is a registered user, the process proceeds to state 210A, where the user is asked to login, if the user has not already done so, by providing a user identifier and/or password. If the user is not a registered user, the process proceeds to state 212A where the user can register and create an account. At state 214A, a determination is made as to whether the user has correctly entered the login data, and/or the account data. If not, the process proceeds back to state 210A or 212A as appropriate. If the user has correctly entered the login data, the process proceeds to 216A, where the user is asked by the system whether the user has a seller account. If not, the process proceeds to state 218A, where the user creates or registers for a seller account.

The ticketing system 120A then generates a new barcode which will be associated with the new ticket to be issued to the second user. The new ticket can be for the same event and seat as the original ticket. The first user's-account will be credited with the resale proceeds from the second user, optionally minus a commission and processing fees. The ticketing servers 102A generate and email an electronic ticket, including the new barcode information and the second user's name, to the second user. The second user can then print the electronic ticket via the printer coupled to the user terminal 112A for use at the corresponding event.

At state 220A, a determination is made as to whether the user has correctly entered the seller account data. If not, the process proceeds back to state 218A. If yes, the process proceeds to 224A, where a determination is made as to whether there are posting restrictions. If not, the process proceeds to state 226A, where the user enters the number and type of tickets, including by way of example, corresponding ticket code. If there are posting restrictions, the process proceeds to state 228A, where the user enters the number and type of tickets, including by way of example, corresponding ticket codes. The user can be prevented from entering more then a predetermined amount of tickets, as per the restrictions, and/or notified that such restriction exists. In addition, when posting multiple tickets, the posting can be required to be for only contiguous seats when the event is not a general admission event. At state 230A, a determination is made as to whether the data was entered successfully, and if not, the process corresponding returns to one of state 226A and state 228A.

At state 232A, the user is asked to enter the identifier(s) for the ticket(s) being posted. At state 234A, the ticket identifier(s) is inspected to make sure they were entered correctly and correspond to identifiers stored in the system database, such as the ticket database. If not, the process returns to state 232A, if yes, the process proceeds to state 236A. At state 236A, a determination is made as to whether the ticket(s) are for a general admission event, that is, an event where seats are not specifically assigned. The determination as to whether the ticket is for a general admission event can be made by asking the user via a form, or via the ticket identifier.

If the ticket is a general admission event the process proceeds to state 240A where the event and ticket details are provided and transmitted to the user terminal, but without listing a specific seat number. If the ticket is not a general admission event, the process proceeds to state 238A where the event and ticket details are provided, including listing a specific seat number. At state 242, a determination is made as to whether the data was entered successfully. If not, the process proceeds back to one of states 3238A, 240A. At state 244A, the legal engine discussed above is invoked to ensure that the posting complies with federal, state, and/or local regulations of the user and/or the venue corresponding to the ticket. The legal engine accesses at one state 246A, 248A, 250A information regarding the price and end date of the posting. The end date can be limited so that enough time is allowed for ticket shipment or delivery. The legal engine can list the maximum legal sales price, or a maximum percentage above face value, due to legal restrictions or restrictions by the ticket issuer or system operator. Because different governmental jurisdictions may have different regulations, the legal engine will select from the appropriate states 246A, 248A, 250A, based at least in part on the applicable governmental jurisdiction, and perform the corresponding regulation compliance evaluation.

For example, state 246A is reached and corresponding is presented if there are no restrictions on the ticket price based on local laws. The user can also be asked to optionally specify a date and/time upon which the tickets are to go off-sale, thereby enabling the user to pursue a sale off the system a few days or other time period before the event if the ticket does not sell on the system. State 248A is reached and corresponding text regarding sale restrictions is presented, if there are legal restrictions and/or a price cap for a ticket resale based on local or other governmental laws. The user can also be asked to optionally specify a date and/time upon which the tickets are to go off-sale. State 250A is reach and corresponding text regarding sale restrictions is presented if there are legal restrictions and/or a price cap for ticket brokers to resell tickets based on local or other governmental laws. The user can also be asked to optionally specify a date and/time upon which the tickets are to go off-sale. Other permutations of legal text can be displayed and the legal text can be dynamically generated based on the applicable rules for the seller, venue, and/or purchaser.

Optionally, the system can provide the user pricing help for the posting. For example, the system can report the highest, lowest, average and/or median posting price for the same seating section or seating area corresponding to that of the user's tickets. In addition, the system can provide information on how much other posted tickets in the seating area, seating section, and/or in any section, actually sold for. For example, the system can list the last five purchases of posted tickets, including section, row number, number of tickets, and price.

At state 252A, a determination is made as to whether the data was successfully entered. If yes, at state 254 the legal engine compares the entered information with the legal rules entered in the database. At state 256A, the completed posting information is displayed on a Web page to the user for verification. For example, the posting information can include the seat section number, row, seat number, asking price per ticket, what multiples the tickets should be sold in, user comments regarding the seats, a sale start date, a sale end date, as well as any appropriate legal disclosures. The user is asked for approval to post the ticket at state 258A. The posting then is performed and a confirmation is sent by the system to state 260A.

Figure 2B:
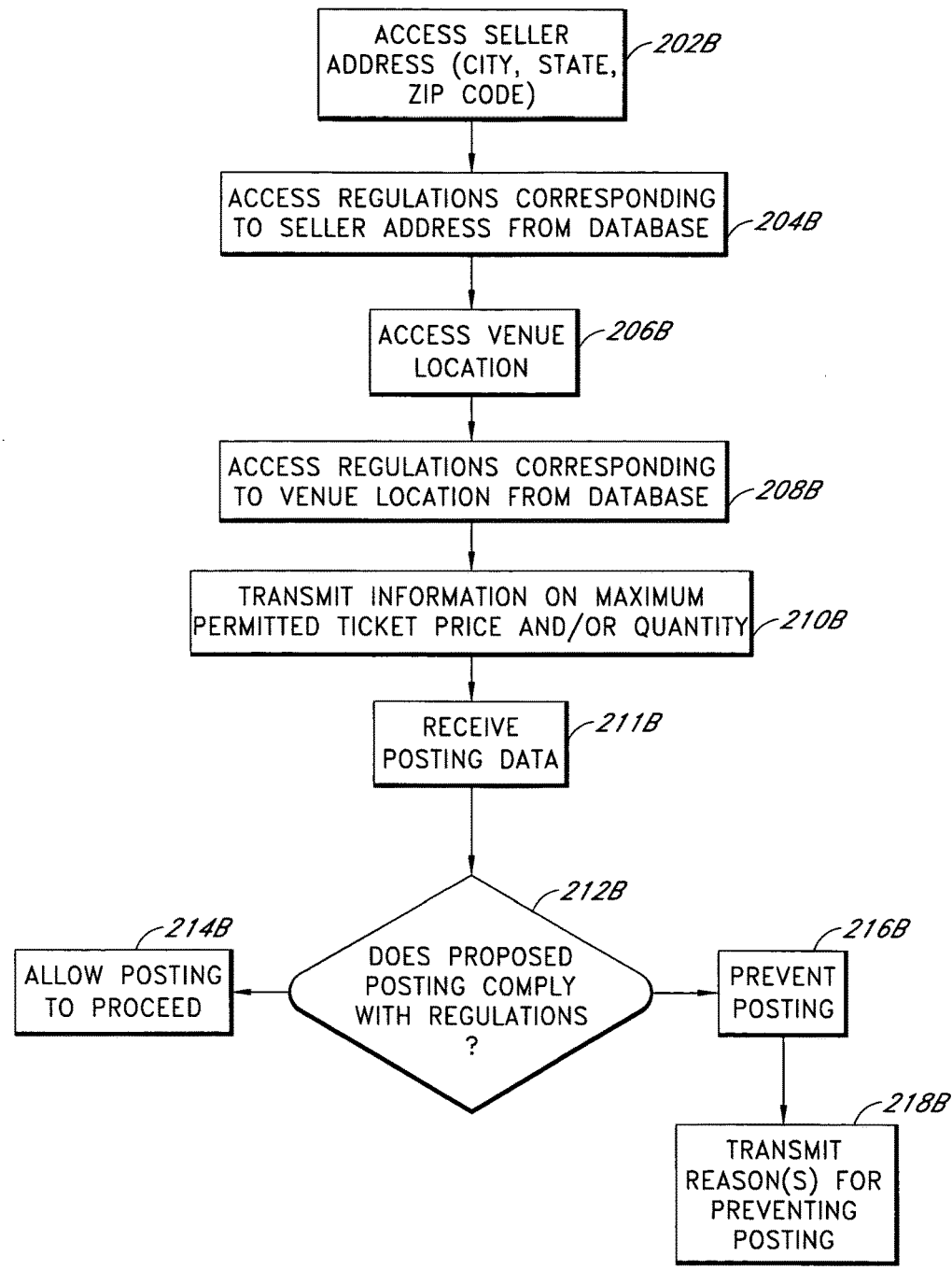

FIG. 2B illustrates one embodiment of a process performed by the legal engine module when invoked during a user ticket posting process. At state 202B, the legal engine accesses location information of the user in order to determine what federal, state, local, system or other area specific regulations apply. The location information can include some or all of the user's street address, city, state, country, and/or zip code information. The location information can be accessed from the user account database portion of the system database, or the location information can be entered during the posting session by the user, or otherwise obtained. At state 204B the regulations, or a representation thereof, corresponding to the user location are selectively retrieved from the system user account database. For example, one of the regulations can relate to a maximum percentage above face value that the user can charge for the ticket. The legal engine can retrieve this percentage from the database. By way of further example, one of the regulations can relate to a maximum number of tickets that a user can resell for a given event, wherein the maximum number is retrieved from the database.

At state 206B, the venue location is identified, wherein the location information can include some or all of the venue's street address, city, state, country, and/or zip code information. At state 208B, the regulations, or a representation thereof, corresponding to the venue location are selectively retrieved from the system database. At state 210B information is transmitted to the user, via a web page, email, or otherwise, regarding the regulations. For example, the system can transmit information on the maximum premium the user can charge above ticket face value, and/or the maximum number of tickets that the user can post for a given event. By way of further example, based on the regulations (such as maximum permitted percentage above face value of a ticket), the system can calculate that allowed maximum value per ticket and/or for the total ticket quantity, and transmit that number to the user. If, for example, the ticket had a face value $50, and the maximum permitted premium is 20%, that the system can calculate that the maximum permitted posting price is 1.20×50=60 dollars, and transmit that information to the user terminal.

At state 211B, the user's posting information, including by way of example, price and/or quantity, is accessed from the system database, directly from a user entry form, or otherwise. Optionally, the user may be prevented from entering posting information that does not comply with regulations. At state 212B, the user posting information is compared with the retrieved regulations to determine as to whether the posting complies with the regulations. For example, the posting price can be compared with the maximum permitted price to determine whether or not the posting price improperly exceeds the maximum permitted price. Similarly, the posting ticket quantity can be compared with the maximum permitted quantity to determine whether or not the posting quantity improperly exceeds the maximum permitted quantity.

If the posting does comply with the regulations, the process proceeds to state 214B and the user is permitted to post the tickets using the previously provided price and/or quantity. If the posting does not comply with the regulations, the process proceeds to state 216B, and the user is prevented or inhibited from posting the ticket using the previously provided price and/or quantity. The process then proceeds to state 218B, and the system transmits to the user, via web page, email or otherwise, the reason or reasons the posting did not comply with the regulation. For example, the user may be notified that the requested price is too high and/or the quantity of tickets is too large.

Figure 2C:
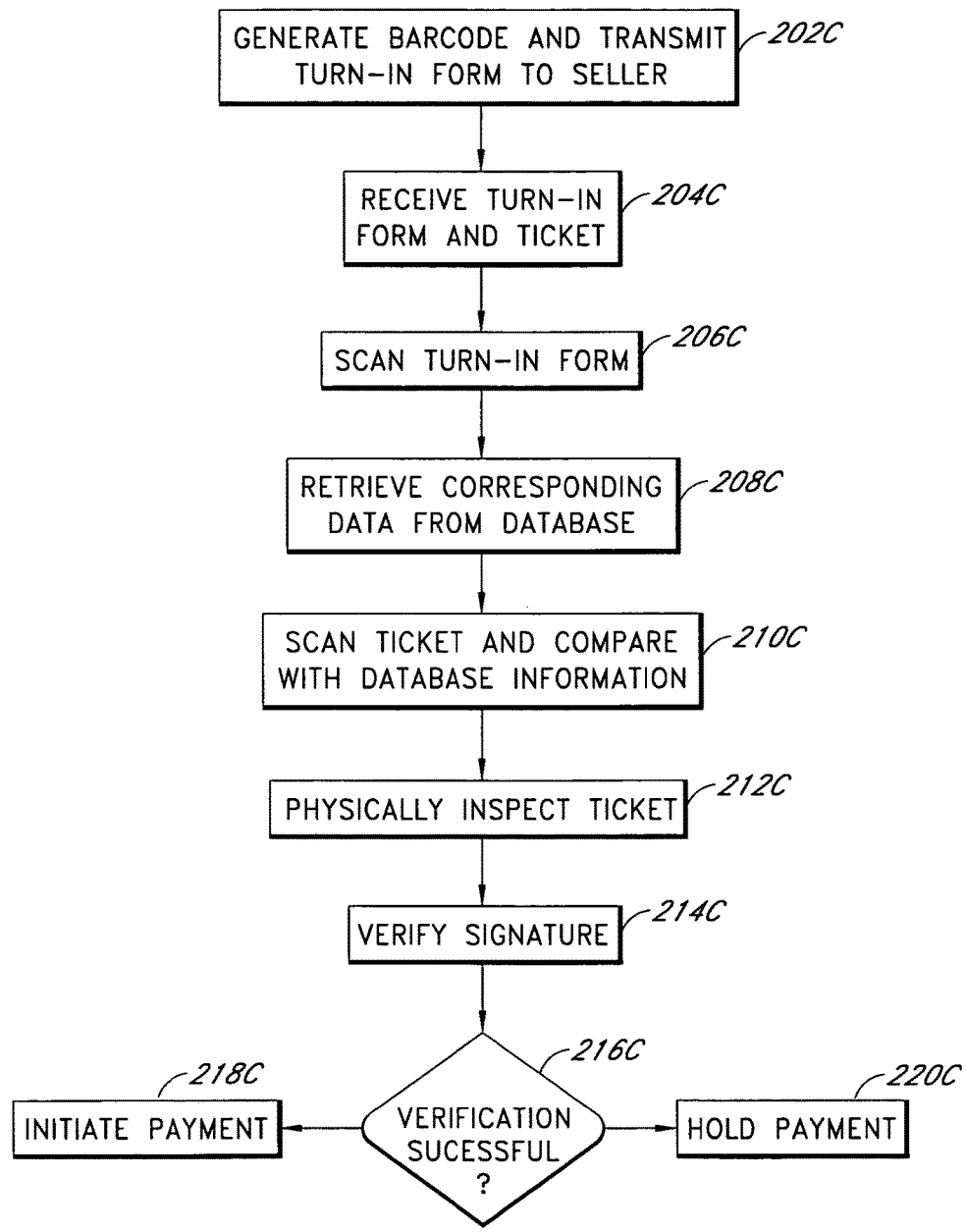

FIG. 2C illustrates one embodiment of a process of verifying a ticket. The process can be used to verify that a seller who sold a ticket via the system to a user has turned in a valid ticket. Advantageously, this helps ensure that the seller does not use the ticket or sell the ticket to still another buyer. Optionally, the successful verification can be a prior condition before remitting payment to the seller for the ticket sale.

At state 202C, a remittance (turn-in) form is transmitted from the system to the seller terminal for printout, the remittance form including one or more of a barcode corresponding to the sold ticket, a confirmation number, the event name, date, location or venue, original price, aggregate seller price and fees, ticket identifier code for each ticket being turned in, seat identifier, contact information, a phone number field in which the seller can enter their phone number or numbers, and a signature line, with the seller name printed in association therewith. At state 204C, the seller returns or mails in the ticket and the accompanying remittance form signed by the seller to a remittance system, which can be the ticketing system. At state 206C, upon receipt an operator scans in the remittance form barcode. At state 208C, ticket and event information corresponding to the barcode is retrieved from the system database and displayed in a pre-populated ticket verification page on an operator terminal. For example, the displayed information can include some or all of the information on the remittance form, such as one or more of the event name, date, location or venue, seat number, ticket identifier(s) the original ticket price, the date the seller posted the ticket for sale on the system web site, the date the ticket was purchased, the price the seller sold the ticket for, and the like. As described below, the operator will enter verification-related information, which will then be stored in the system database.

At state 210C, for the ticket returned by the seller, the operator scans the ticket and/or ticket barcode. The system compares the scanned in information with transaction information retrieved from the database and determines whether the ticket information matches the information retrieved from the database and informs the operator of such determination via the verification page. If the user turned in a ticket that had originally been delivered by the ticketing system to the seller as a physical ticket, at state 212C the operator examines the ticket physically to ensure that the ticket card stock is the proper stock and that the ticket information is correct. If the physical inspection verifies the ticket, the operator enters the verification into the verification form. If the seller was to turn in several tickets, and one or more tickets are missing, a notification can be sent to the seller regarding the missing ticket or tickets.

At state 214C, the operator verifies that the seller's signature on the remittance form. If the signature is properly provided, the operator enters a corresponding signature verification indication into the verification page. At state 216C, a determination is made by examining the operator and/or scanned entries as to whether all or selected inspected items have been verified. If the verification was successful, the process proceeds to state 218C, and payment to the seller is released, and an email notification or the like is transmitted to the seller. If the verification fails, the process proceeds to state 220C, and the returned remittance form, ticket, and envelope in which the foregoing were mailed, are set aside for further investigation by a manager or other personnel, and payment is not initiated at this time until the verification is satisfactorily completed. Once the verification problems are resolved, payment is released to the seller, and an email confirmation or the like is optionally sent to the seller regarding the payment release.

Figure 5A:

FIG. 5A illustrates an example user interface for performing a search for events. A search field 502A is provided. The user can enter the name of an event, date, and/or venue for which the user wished to post a ticket for. In addition, a listing 504 may be provided for events that are sold out, or at least a certain percentages of available tickets have sold, making it likely that is a user wants to purchase a ticket to those events, they will need to buy it in the secondary market from someone who is reselling a ticket. The listing 504 optionally includes the number of tickets for each event that are available from other users, a description of the event, the event venue, and/or the event date.

FIG. 5B illustrates an example search results screen for a particular event. Column 502B lists event dates. Column 504B lists the performer. Column 506B lists the venue. Column 508B provides corresponding links with which the user can post the user's ticket for sale.

FIG. 5C provides a listing for a search for tickets be resold by previous purchasers for a given event. Column 504C lists the section and row of seats that are available. Column 506C lists the ask price. Column 508C lists an identifier corresponding to the ticket seller. Column 510C lists the number of available tickets. Column 512C provides a view listing link, which if the user so selects, will cause addition information on the listing to be transmitted to the user terminal for display.

Figure 5D:

FIG. 5D provides a ticket details form that provides detailed information on a ticket available for resale. The form provides comments from the seller 502D, pricing and seating information, seller information, and sale end date at 504D, and quantity and total price per ticket at 506D. A continue link is provided via which the user can purchase the listed tickets.

In addition to searching for tickets, a user can browse for events and tickets. For example, events can be categorized by type, such as sporting events and musical events. The user can select an event type and the user will be presented with upcoming events, and can be provided with information on the available tickets.

As similarly discussed above, a ticket holder can forward the ticket as an attachment to an email sent to an email address. Optionally, the user can be required to email the ticket via the system.

Figure 3A:
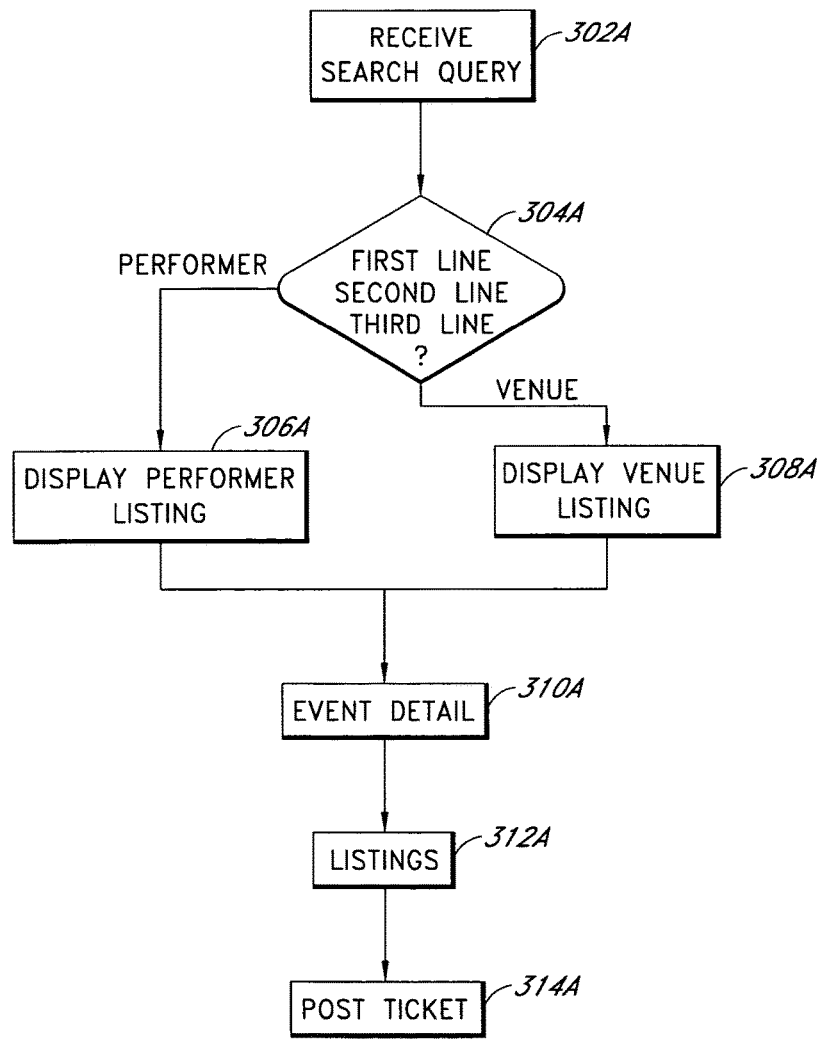
FIGS. 3A-D illustrate additional example processes of searching for, posting and transferring tickets.

FIG. 3A illustrates an example search process for posting a ticket. Optionally, a user or seller can elect to browse events for which to post a ticket for sale, or can sear for an event. If the user elects to search, the system receives a search query over a network from the user terminal at state 302A. At state 304A, a determination is made as to whether the user is searching for a venue or a performer, which can be an entertainer or a sports team.

If the user is searching for a performer, the process proceeds to state 306A, wherein a listing of upcoming events include the performer is transmitted to the user terminal for display. The listing can include the type of event, such as rock, theater, and dance, the scheduled dates, the number of seats available, the venue, the percentage of seats that have already been ticketed, and the like. If the user is searching for a venue, the process proceeds to state 308A, wherein a listing of upcoming events at the searched for venue is transmitted to the user terminal for display. The venue listing can include the performer or event, the scheduled dates, the number of seats available, the venue, the percentage of seats that have already been ticketed, and the like.

If the user selects one of the listed events at either state 306A or 308A, the process proceeds to state 310A, where details of the selected listing is transmitted for display on the user terminal. The detailed listing can provide information such as the face value of tickets being sold for the event, the performed, the venue, the event start time, a description of the event, the number of seats available, the percentage of seats that have already been ticketed, and the like. At state 312A, the user can return to a listing page, and select another detailed listing. At state 314A, the user can indicate for which event the user wants to post one or more tickets for sale.

Figure 3B:
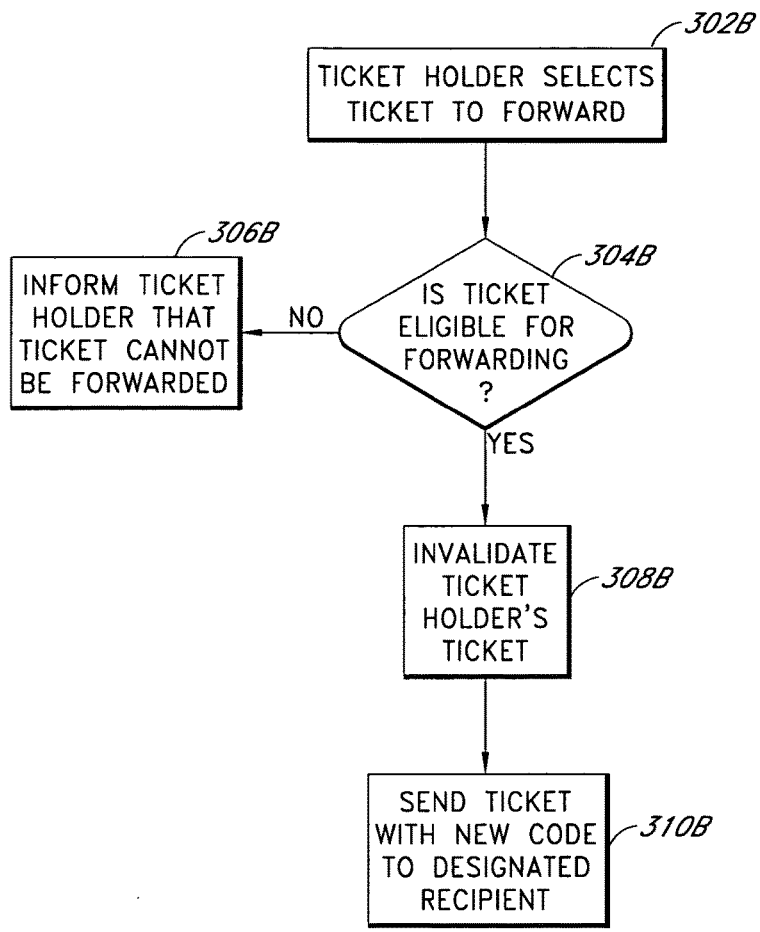

FIG. 3B illustrates an example forwarding process. At state 302B, a ticket holder, who can be restricted to a season ticket holder, is presented by the system with a list of unused tickets of the ticket holder. The ticket holder can select one or more tickets to forward to a designated recipient. The ticket holder can be requested to provide the designated recipient's email or regular mail address. At state 304B, the system can determine if the ticket is eligible for forwarding. For example, the system can compare information regarding the particular event or service associated with that stored in the system database to determine if there are restrictions for that event or service which prevent ticket forwarding.

If the ticket is not eligible, the process proceeds to state 306B and the ticket holder is notified that the ticket will not be forwarded and the reason therefor. If the ticket is eligible for forwarding, the process proceeds to state 308B. At state 308B, the ticket holder's ticket is invalidated or canceled so that it cannot be used as similarly discussed above. Optionally, the user can be prevented from recalling the ticket, even if the ticket has not yet been sent.

At state 310B, the ticket is forwarded to the designated recipient. The forwarded ticket can contain an additional code or identifier, and/or a different ticket code or identifier than the original ticket to thereby allow the original ticket to be designated as invalid, when the ticket is forwarded. The additional or different code can be stored in the system database with an indication that the ticket was forwarded for later validation of the forwarded ticket upon use, and to limit the recipient's ability to further forward and/or sell the ticket. Once the recipient receives the emailed ticket, the recipient can print out the ticket for use. Optionally, the ticket can instead be sent to the designated recipient via regular mail or can be picked up at an event venue office. The user and/or recipient can be charged a fee for the forwarding service, or the service can be provided without a fee. Optionally, the recipient of the forwarded ticket can be prevented from reselling or forwarding the ticket.

Optionally, if an event for which corresponding to a forwarded is cancelled and refunds or credits are issued, the original ticket holder will receive a credit, and the forwarding recipient will not. Optionally, instead, the forwarding recipient can be provided the credit. If an event corresponding to a forwarded ticket is postponed, then optionally, the ticket will not be returned to the original holder and the forwarding recipient will be able to use it to attend the event at the rescheduled time. Optionally, instead, the original ticket holder will be provided a ticket for the rescheduled time.

Another embodiment of transferring tickets will now be described. For example, the embodiment provides systems and methods enabling season ticket holders for sporting events, or the like, to post tickets for purchase by others.

Figure 3C:
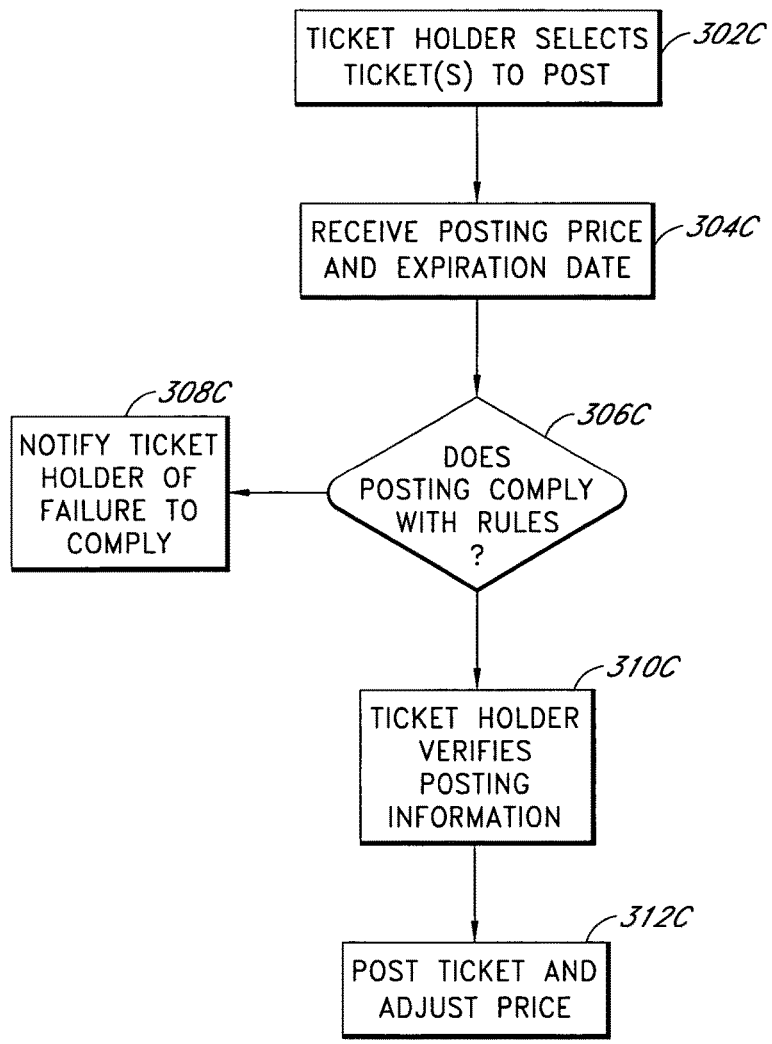

FIG. 3C illustrates an example process in which a ticket holder can post a season ticket, though other tickets can be posted as well. In addition, some or all of the states described above with respect to FIG. 2A can be incorporated in FIG. 3C and/or can replace the states illustrated in FIG. 3C. At state 302C, the ticket holder can log into an account manager that can be accessed at a Web site over the Internet or an intranet. Using a ticket selection screen transmitted by the system to the ticket seller terminal, the ticket holder can select one or more tickets, such as a season ticket, that the user wants to sell. At state 304C, the user can then proceed to a posting screen where the ticket holder can specify a posting price and an expiration date for the posting. The system can constrain the expiration date via rules stored in and retrieved from the system database. For example, the expiration date can be constrained to be a specified number of days or weeks prior to the event corresponding to the ticket to ensure the ticket can be delivered in a timely fashion.

At state 306C, a determination is made as to whether the posting complies with rules of the ticket issuer, the system, and/or governmental regulations. For example, information associated with the ticket can be compared with rule criteria stored in the system database. By way of further example, certain season ticket holders, such as suite season ticket holders and/or complimentary season ticket holder, can be prevented from reselling tickets. Further, the season ticket holder can optionally be restricted in how much or how little the ticket can be sold for. For example, the season ticket holder can be prevented from selling the ticket below face value, or above a maximum dollar amount or above a certain percentage of the ticket face value. The ticket holder can optionally be prevented from selling more than a predetermined amount of tickets at a time, and/or more than a predetermined number of tickets within a predetermined period, such as within a season. Optionally, the ticket holder can be selectively prevented from posting tickets for one or more specified games. The restrictions can be selectively changed as desired, such as during a playoff season. Further, the ticket holder can be prevented from posting tickets for events that have already occurred, tickets that do not have barcodes, or tickets that are designated ineligible by the team or other ticket issuer.

If the posting does not comply with the rules, the process proceeds to state 308C, and the ticket holder is informed that the ticket cannot be posted in accordance with the ticket holder's instructions, and the reason why the ticket cannot be posted. For example; the ticket holder can be informed that the price is too high or too low, that the quantity of tickets is too great, or that the ticket is altogether ineligible for resale. The ticket holder can be informed of the foregoing via a notification presented on a Web page in substantially real time, via email, or otherwise. If the user can or is willing to alter the posting to comply with the rules or regulations, such as by changing the price or quantity, the user can proceed back to state 302C and appropriately re-post or modify the original post.

If the posting does comply with the rules, the process proceeds to state 310C. At state 310C, the ticket holder is asked to verify that the selling or posting information is correct. Once the ticket holder has verified the posting information, the user can approve the posting by clicking on a "Post Tickets For Sale" button, or the like. Shortly thereafter, at state 312C, the ticket is posted on a Web site associated with the corresponding sports team and/or the system operator. Optionally, the system can automatically increase the season ticket holder's requested posted price by a certain percentage or dollar amount. For example, the ticket can be listed for sale for 120% of the posting price specified by the ticket holder. If the ticket is purchased, the buyer will pay 120% of the posting price plus optionally an authentication and delivery fee. The 20% difference, the authentication fee, and the delivery fee can be split evenly or in different proportions among the venue, system operator, the sports team, and other applicable entities.

Figure 3D:
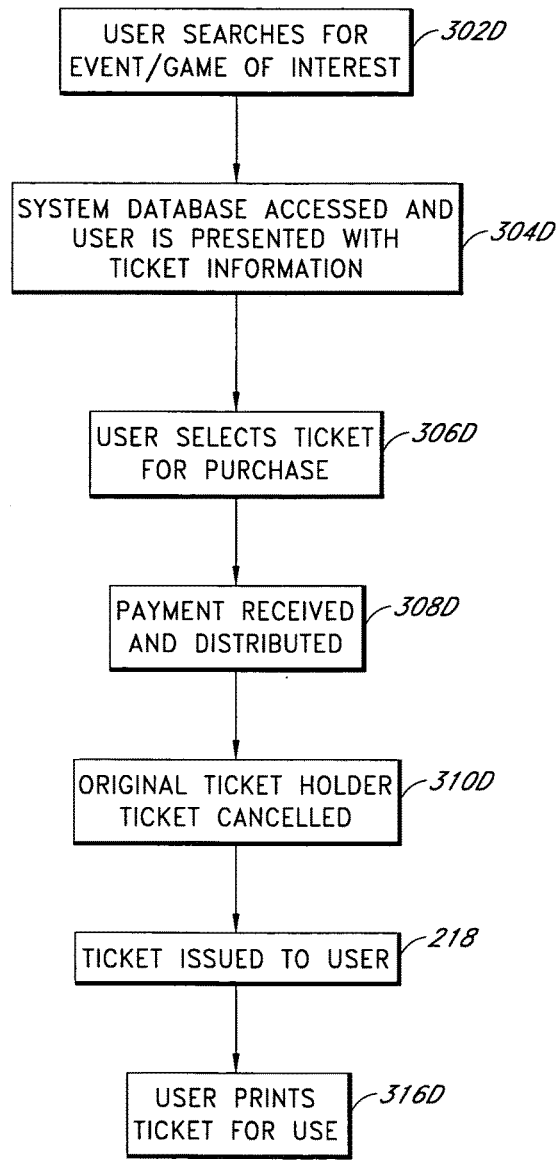

With respect to purchasing posted tickets, FIG. 3D illustrates an example ticket purchase process. At state 302D, a user can access via a user terminal a ticketing website hosted by the system to browse or search for a game or other event the user is interested in attending. Once the user has identified a game or other event of interest, at state 304D, the user selects a "View Listings" button or the like to see the available tickets for that particular game/event. The relevant information is retrieved from the system or other database, and the information is transmitted over the network to the user terminal and displayed as a listing or otherwise. The user can then view the listing, which includes columns providing the ticket price, identifying the corresponding seats, and the quantity of tickets. The user can sort the listing on each of the columns.

At state 306D, the user can select the tickets the user would like to purchase, by clicking on a select or buy button, and proceed through to checkout. At state 308D, the user pays for the ticket via credit card or otherwise. When purchasing the ticket, the user will pay the listed price and/or appropriate corresponding processing and verification fees. A percentage and/or dollar amount of the price can be split evenly or unevenly between the system operator, venue operator, sports team, and/or other entity. The reminder of the purchase price can be paid or credited to the ticket holder and the ticket holder's original ticket is invalidated. Optionally, the credit can be restricted for use to buy additional tickets for the corresponding sports team and/or at other events associated with the ticket issuer.

At state 310D, the original ticket held by the season ticket holder is cancelled. At state 312D the user will be issued new tickets by email, regular mail, or otherwise. For example, the ticket can be attached to an email as a PDF file, downloaded from a website or printed from a Web page. If the ticket is provided electronically, at state 314D, the user can then print the ticket for use.

Figure 4A:
FIGS. 4A-4B correspondingly illustrate an example original issued ticket and a new ticket replacing the original issued ticket.

FIG. 4A illustrates an example printout of an electronic ticket issued by the system to the original purchaser. As illustrated, the ticket includes a "purchased by" field that lists the purchaser name, a section filed that lists the seat section, a row field that lists the seat row, a seat field that lists the seat number, a confirmation field that lists the confirmation code, an event date, and a ticket price. In addition, a ticket barcode is provided. The barcode is intended to be scanned at an event site, and once scanned, an indication that the ticket has been used can be stored in the system database or other database to prevent the ticket from being reused.

Figure 4B:

FIG. 4B illustrates an example printout of an electronic ticket issued by the system to a second purchaser who purchased the ticket from the original purchaser via the system. In this example, the information is the same for both the original ticket, illustrated in FIG. 4A, and the resold ticket, illustrated in FIG. 4B, except for the name listed in the "purchased by name" and a code 402B used to indicate that the ticket is FIG. 4B is a resold ticket. While the illustrated code is a numeric code, the code can also be in the form of a barcode, an alphanumeric code, or other code type. Optionally, the tickets can vary in more or fewer ways.

Figure 6A:
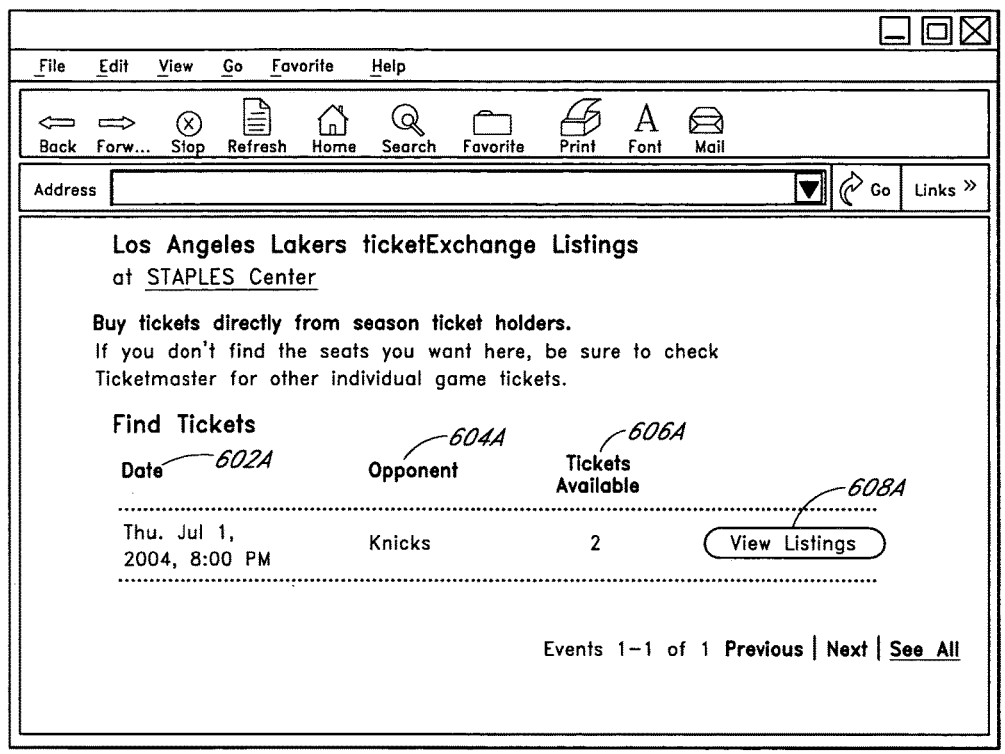

FIG. 6A illustrates another embodiment of a Web page that provides an example result of a search for tickets, such as season tickets associated with a sporting event. In this example, the search was performed via a team specific Web site, wherein the search results are optionally all related to that team. In this example, the team site is the Los Angeles Lakers website. The search query was "July 1", and the system searched for games in which the Lakers are a participant and that take place on July 1. As illustrated, the listing lists the date 602A, the opposing team 604A, and the total number of available tickets for the game 606A. The user can select a view listings button 608A to view additional information on the actual postings.

Figure 6B:
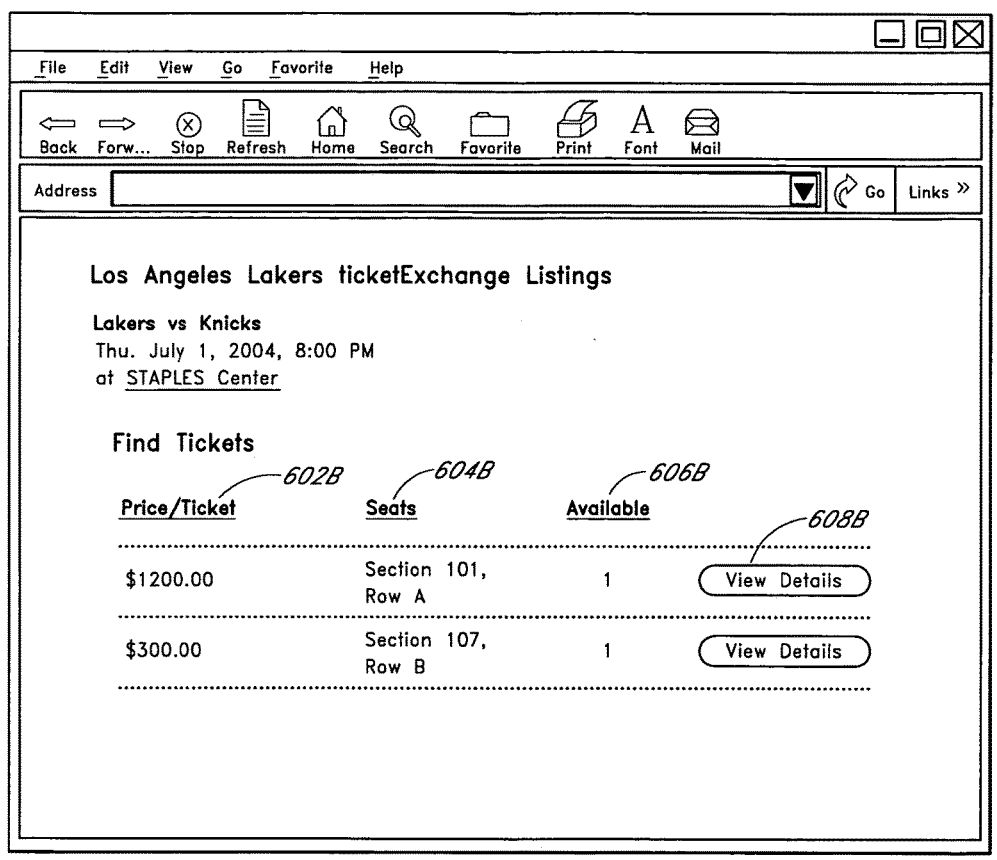

FIG. 6B illustrates an example view listing Web page that is provided in response to the user clicking on the view listing button 608A. The listing Web page lists the price per ticket 602B, the seat location 604B, and the number of seats available in that location or area 606B. The user can select a view details button 608B to view listing details, including the section, row, and/or exact seat number, if it is not a general admission ticket, the ticket price, related processing fees, total price, the time, date, and location of the event.

Figure 6C:
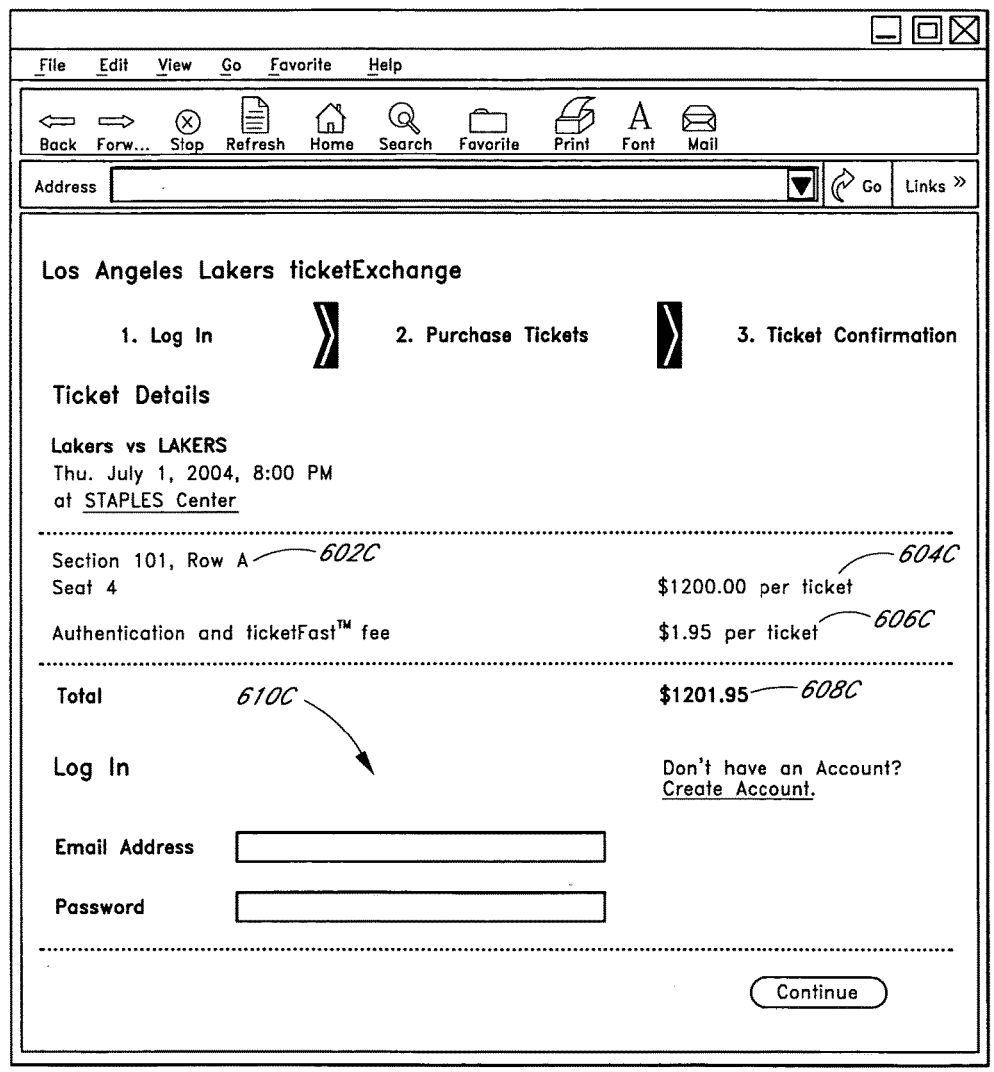

FIG. 6C illustrates an example details Web page that can be transmitted to a user terminal for display in response to the user selecting the details link in FIG. 6B. The page lists the precise seat location 602C, the price per ticket 604C, authentication and provisioning fee 606C, and a total price 608C. If the user has an account, the user can log in using the log in fields 610C, which, by way of example, can include the user's email address, other identifier, and a password. If the user does not have an account, the user can create one before completing the ticket purchase.

Figure 6D:
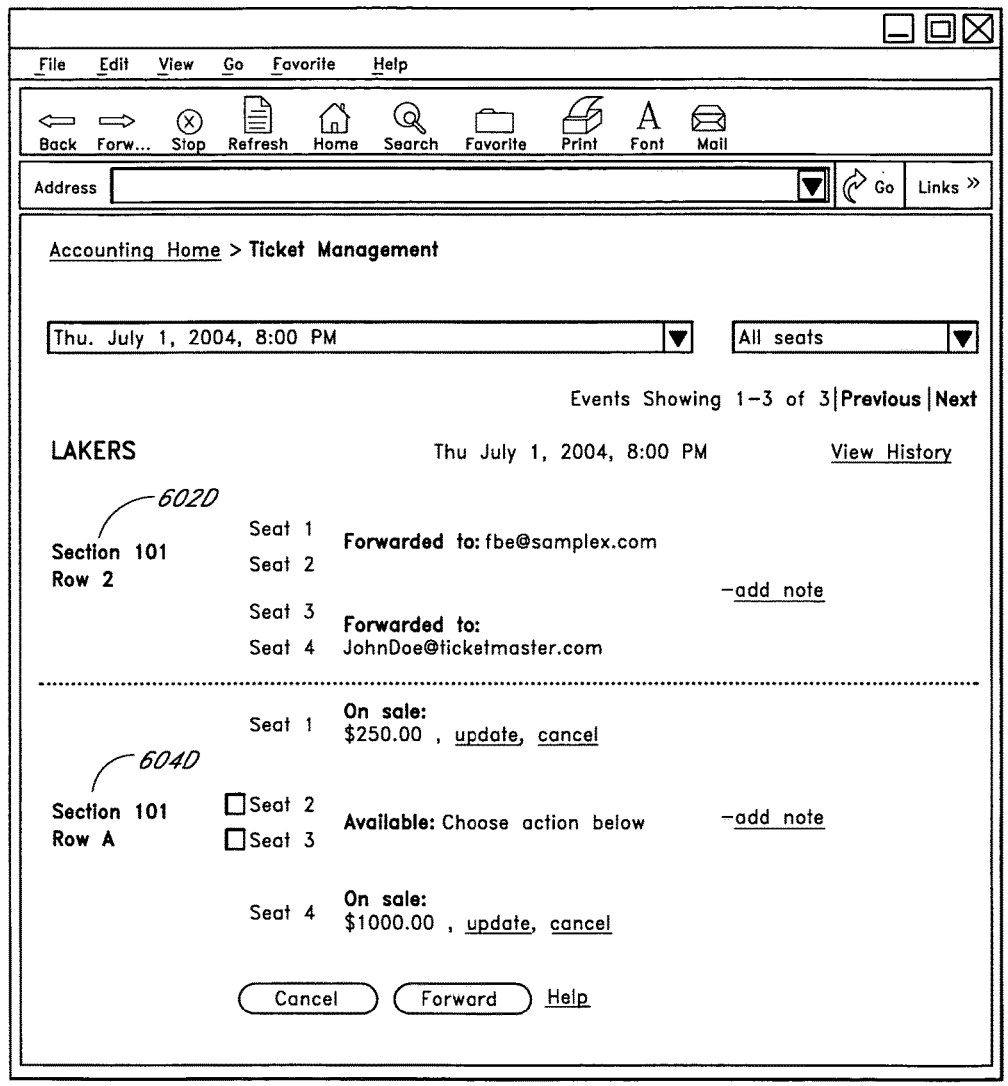

FIG. 6D illustrates a ticket management Web form generated by an account management application module via which a user can manage their tickets. For example, area 602D lists seats in a first seating area for a Lakers game scheduled on Jul. 1, 2004. As indicated, the user's seats 1-4 have already be forwarded or transferred to another. For example, seats 1 and 2 were forwarded to email address fbe@samplex.com, while seats 3 and 4 were forwarded to john.doe@ticketmaster.com. By way of further example, area 604D indicates that the user has already put seat 1 on sale for $250, and seat 4 for $1000. Seats 2 and 3 are still available to be sold to another or forwarded to another. The user can click on the check boxes associated with seats 2 or 3 in order to indicate that the user wants to take an action with respect to those seats. The user can then select a "sell" button in order to place the tickets for sale, or on a "forward" button if the user wants to forward the ticket rights to another without collecting payment via the system.

If the user selects the sell button, a "post for sale page" is transmitted to the user terminal for display. FIG. 6E illustrates an example post a ticket Web page. Area 602E lists the tickets and the price originally paid by the user for the ticket. Area 604E provides an area wherein the user can specify the price at which the ticket is to be posted. Optionally, the user can be restricted with respect to how much or little the user can charge. For example, the user can be prevented from charging less than the ticket face value or the price paid by the posting user. The user can also be optionally limited to charging no more than a specified price, such as, by way of example, $5,000. Area 606E provides an expiration date field 606E, wherein the user can specify a date by which the tickets will be withdrawn from sale if the tickets are not purchased by the designated expiration date.

FIG. 6F illustrates an example ticket posting verification page that lists the corresponding event, seats, posting price, and posting expiration date. If the user is satisfied with the listing, the user can click on a post tickets for sale button or link and the ticket will be posted.

Thus, as described above, embodiments of the present invention provide a ticket system that enables users to transfer or sell tickets to other users, and to buy tickets from other users. Purchasers can advantageously buy tickets on the secondary ticket market with similar confidence as in the primary ticket market. The ticketing system can deliver tickets to a purchaser of tickets being resold. In addition, once the ticket is resold, the system can cancel the original tickets and reissue tickets with a different code to the purchaser.

It should be understood that certain variations and modifications of this invention would suggest themselves to one of ordinary skill in the art. The scope of the present invention is not to be limited by the illustrations or the foregoing descriptions thereof.

What is claimed is:

1. A computer-implemented method comprising:
   providing a user interface for display via a first user terminal to a first user, the user interface including:
   a sale posting control configured to accept an instruction from the first user to post at least one ticket for sale to other users accessing a first networked computer resource, wherein the other users may submit purchase requests for the at least one ticket via the first networked computer resource; and
   a ticket forwarding control, different than the sale posting control, configured to accept an instruction from the first user to forward at least one ticket directly to another user without collecting payment from the other user via an apparatus;

receiving a ticket posting instruction transmitted over a network from the first user terminal by the first user, wherein the ticket posting instruction from the first user includes at least a first code that includes ticket authentication information, the first code previously provided to the first user with a first ticket that had been previously provided to the first user, the first ticket for a first seat at a first event, the first ticket being a physical ticket;

authenticating the first ticket using at least the first code;

determining, based on the first code, whether the first ticket was forwarded to the first user by an initial ticket holder that purchased the first ticket or a corresponding first ticket from a ticket issuer, wherein a determination that the first ticket was forwarded to the first user indicates that the first user is to be limited in ability to sell the first ticket;

when it is determined that the first ticket was not forwarded to the first user, posting the ticket on the first networked computer resource;

receiving an order instruction from a second user;

transforming a validity of the first ticket associated with the first user into a validity of a second ticket associated with the second user by:
    invalidating the first ticket at least partly in response to the order instruction; and
    issuing the second ticket to the second user for the same seat at the same event as the first ticket;

determining that the first user has returned the first ticket; and at least partly in response to determining that the first user has returned the first ticket, issuing a credit to the first user; and when it is determined that the first ticket was forwarded to the first user, notify the first user that the transfer is prohibited.

2. A computer-implemented method comprising:

providing a user interface for display via a first user terminal to a first user, the user interface including:
    a sale posting control configured to accept an instruction from the first user to post at least one ticket for sale to other users accessing a first networked computer resource, wherein the other users may submit purchase requests for the at least one ticket via the first networked computer resource; and
    a ticket forwarding control, different than the sale posting control, configured to accept an instruction from the first user to forward at least one ticket directly to another user without collecting payment from the other user via an apparatus;

receiving a ticket posting instruction transmitted over a network from the first user terminal by the first user, wherein the ticket posting instruction from the first user includes at least a first code that includes ticket authentication information, the first code previously provided to the first user with a first ticket that had been previously provided to the first user, the first ticket for a first seat at a first event;

authenticating the first ticket using at least the first code;

determining, based on the first code, whether the first ticket was forwarded to the first user by an initial ticket holder that purchased the first ticket or a corresponding first ticket from a ticket issuer, wherein a determination that the first ticket was forwarded to the first user indicates that the first user is to be limited in ability to sell the first ticket;

when it is determined that the first ticket was not forwarded to the first user:
    posting the ticket on the first networked computer resource;
    receiving an order instruction from a second user;
    transforming a validity of the first ticket associated with the first user into a validity of a second ticket associated with the second user by:
        invalidating the first ticket at least partly in response to the order instruction; and
        issuing the second ticket to the second user for the same seat at the same event as the first ticket; and when it is determined that the first ticket was forwarded to the first user, notify the first user that the transfer is prohibited.

3. A networked ticketing apparatus, comprising:

a first database including records that contain identifier codes associated with tickets;

a computing device including one or more processors;

a tangible non-transitory computer readable memory;

a first networkable server including instructions, stored in the tangible non-transitory computer readable memory, that when executed by the computing device, are configured to:
    provide a user interface for display via a first user terminal to a first user, the user interface including:
        a sale posting control configured to accept an instruction from the first user to post at least one ticket for sale to other users accessing a first networked computer resource, wherein the other users may submit purchase requests for the at least one ticket via the first networked computer resource; and
        a ticket forwarding control, different than the sale posting control, configured to accept an instruction from the first user to forward at least one ticket directly to another user without collecting payment from the other user via the apparatus;
    receive a ticket posting instruction transmitted over a network from the first user terminal by the first user, wherein the ticket posting instruction from the first user includes at least:
        a first code that includes ticket authentication information, the first code previously provided to the first user with a first ticket that had been previously provided to the first user, the first ticket for a first seat at a first event, the first ticket being a physical ticket;
        a ticket asking price; and
        an instruction to automatically adjust the ticket asking price based on secondary ticket sales data for the first event;
    authenticate the first ticket using at least the first code;
    identify a transfer rule based on a law or regulation that is applicable based on a locality of the first user or venue;
    determine whether transfer of the first ticket is prohibited based on the transfer rule;
    determine, based on the first code, whether the first ticket was forwarded to the first user by an initial ticket holder that purchased the first ticket or a corresponding first ticket from a ticket issuer, the forward occurring in a manner such that payment was not collected from the first user for the forwarding, wherein a determination that the first ticket was forwarded to the first user indicates that the first user is to be limited in ability to sell the first ticket;

determine, based on the first code, whether the first ticket had been previously issued;

when it is determined that transfer of the first ticket is not prohibited based on the transfer rule and when it is determined that the first ticket was not forwarded to the first user by the initial ticket holder that purchased the first ticket or the corresponding first ticket from the ticket issuer, the forward occurring in a manner such that payment was not collected from the first user for the forwarding and when it is determined that the first ticket had been previously issued:

provide a first form, separate from the first ticket, that includes a barcode associated with the first ticket;

post the first ticket on the first networked computer resource for the ticket asking price;

receive a request from the first user requesting notifications of purchases of tickets sold by other users;

transmit an email or instant message to the first user that identifies an other ticket for the first event sold by another user and a price at which the other ticket was sold;

adjust the ticket asking price based on detected secondary ticket sales data;

detect a ticket purchase request from a second user for one or more tickets in a section at the first event, the first seat being in the section;

determine that there are no remaining primary market tickets for one or more seats in the section at the first event;

facilitate presentation of a webpage to the second user that lists previously sold tickets held by other users that are offered for sale in a secondary market, the previously sold tickets including the first ticket and the webpage indicating that the first ticket is available for the adjusted ticket asking price;

receive, via the webpage, an order instruction from a second user;

accept payment from the second user for the adjusted ticket asking price;

transform a validity of the first ticket associated with the first user into a validity of a second ticket associated with the second user by:
 invalidating the first ticket at least partly in response to the order instruction; and
 issuing the second ticket to the second user for the same seat at the same event as the first ticket;

identify a credit amount as being the adjusted ticket asking price minus one or more fees;

facilitate payment of a fee of the one or more fees to each of a venue provider and a performer or sports team associated with the first event;

determine that the first user has returned the first ticket and the first form;

at least partly in response to determining that the first user has returned the first ticket and the first form, issue a credit for the credit amount to the first user; and transmit a message over a computer network to a computer system associated with an administrator or operator of the first event that indicates that the first ticket has been transferred from the first user to the second user via issuance of the second ticket; and when it is determined that the first ticket was forwarded to the first user by the initial ticket holder that purchased the first ticket or the corresponding first ticket from the ticket issuer, the forward occurring in a manner such that payment was not collected from the first user for the forwarding, notify the first user that the transfer is prohibited.

4. The networked ticketing apparatus as defined in claim 3, wherein the instructions, when executed, by the computing device, are further configured to generate a code associated with the second ticket, wherein the code associated with the second ticket indicates that the second ticket is a result of a resale operation.

5. The networked ticketing apparatus as defined in claim 3, wherein the instructions, when executed, by the computing device, are further configured to provide and store an invalidation indication in a database record associated with the first ticket to inhibit use of the first ticket.

6. The networked ticketing apparatus as defined in claim 3, wherein the instructions, when executed, by the computing device, are further configured to:
 provide a first electronic form to the first user, the first electronic form configured to receive information from the first user for posting the first ticket,
 the first electronic form, when presented to the first user, including pre-populated information accessed from a database using the first code, the pre-populated information including at least seat information and event information.

7. The networked ticketing apparatus as defined in claim 3, wherein the instructions, when executed, by the computing device, are configured to include in the second ticket at least one code that is not on the first ticket so that it can later be determined that the second ticket corresponds to a resold ticket.

8. The networked ticketing apparatus as defined in claim 3, further comprising the second ticket, wherein the second ticket is stored in non-transitory tangible media configured to provide access to the event.

9. The networked ticketing apparatus as defined in claim 3, wherein the instructions, when executed, by the computing device, are configured to automatically identify and transmit information to the first user relating to posting prices from other users for the first event via an alert in the form of an email or an instant messaging service.

10. The networked ticketing apparatus as defined in claim 3, wherein the instructions, when executed, by the computing device, are further configured to access and transmit information to the first user terminal on tickets that had been acquired by the first user, the information indicating:
 which of the tickets acquired by the first user have been forwarded to other users, and
 which of the tickets acquired by the first user have been posted for sale,
 wherein forwarded tickets forwarded by the first user are electronically forwarded in response to an instruction from the first user provided using the ticket forwarding control, without collecting payment from recipients of the forwarded tickets via the apparatus and
 wherein tickets posted for sale by the first user are posted for sale in response to an instruction from the first user provided using the ticket posting control.

11. The networked ticketing apparatus as defined in claim 3, wherein the instructions, when executed, by the computing device, are further configured to provide and store in a database information regarding the issuance of the first ticket to the first user, the issuance of the second ticket to the second user, and an issuance of a third ticket to a third user for the first seat at the first event.

12. The networked ticketing apparatus as defined in claim 3, wherein the instructions, when executed by the computing device, are further configured to:
determine, based on the first code, whether the first ticket was forwarded to the first user by an initial ticket holder, wherein a determination that the first ticket was forwarded to the first user indicates that the first user is to be limited in ability to sell the first ticket, wherein the ticket is posted when it is determined that the first ticket was not forwarded to the first user.

13. The networked ticketing apparatus as defined in claim 3, wherein:
the ticket posting instructions includes a posting price, and
the instructions, when executed by the computing device, are further configured to determine, using location information associated with the first user and the posting price, whether the posting price complies with a first regulation related to ticket transfer, wherein the ticket is posted when it is determined that the posting price complies with the first regulation.

14. A ticketing apparatus, comprising:
a database of information on tickets previously sold to users that are being offered for resale by the users, the database including at least seating and price information for a first ticket of a first user, and being stored in non-transitory tangible computer media, the first ticket being a physical ticket;
one or more non-transitory tangible computer readable memories;
a search engine, comprising instructions stored in the one or more non-transitory tangible computer readable memories that, when executed are configured to receive a search request transmitted over a network from a terminal associated with a second user and to selectively transmit to the terminal associated with second user information retrieved from the database, including at least the seating and price information for a first ticket; and
one or more processors;
at least a first computer instruction, stored in the one or more non-transitory tangible computer readable memories that, when executed by the one or more processors, is configured to:
provide a user interface for display via a first user terminal to the first user, the user interface including:
a sale posting control configured to accept an instruction from the first user to post at least one ticket for sale to other users accessing a first networked computer resource, wherein the other users may submit purchase requests for the at least one ticket via the first networked computer resource;
a ticket forwarding control, different than the sale posting control, configured to accept an instruction from the first user to forward at least one ticket directly to another user without collecting payment from the other user via the apparatus;
authenticate tickets from one or more ticket sellers, including the first user, prior to posting the tickets from the one or more ticket sellers, including the first ticket of the first user, for sale via an electronic marketplace, wherein the authentication is performed using information electronically provided via respective terminals of the one or more ticket sellers;
receive a purchase instruction from the second user;
at least partly in response to the purchase instruction:
transform a validity of the first ticket associated with the first user into a validity of a second ticket associated with the second user by invalidating the first ticket of the first user and issuing the second ticket to the second user for the same seat as that of the first ticket;
determine that the first user has returned the first ticket; and
at least partly in response to determining that the first user has returned the first ticket, issuing a credit to the first user.

15. The ticketing apparatus as defined in claim 14, wherein the at least the first computer instruction, when executed by the one or more processors is further configured to generate a perceptible code visible on the second ticket, wherein the perceptible code indicates that the second ticket is a result of a resale operation.

16. The ticketing apparatus as defined in claim 14, wherein the at least the first computer instruction, when executed by the one or more processors is further configured to automatically adjust a value of a previously posted first user specified parameter, wherein the first parameter is a ticket asking price, and to post that adjusted value in association with the first ticket,
wherein the automatic adjustment of the ticket asking price is based at least in part on an adjustment instruction provided when the first user posted a previous asking price for the first ticket.

17. The ticketing apparatus as defined in claim 14, wherein the at least the first computer instruction, when executed by the one or more processors is further configured to provide and store in non-transitory tangible computer readable media, an invalidation indication associated with the first ticket.

18. The ticketing apparatus as defined in claim 14, wherein the second ticket is an electronic ticket.

19. The ticketing apparatus as defined in claim 14, further comprising a first electronic form configured to cause price information associated with the first ticket to be stored in the database.

20. The ticketing apparatus as defined in claim 14, wherein the at least the first computer instruction, when executed by the one or more processors is further configured to identify a quantity of tickets posted for sale of a quality similar to the first ticket, and
wherein the transmitted information includes one of a first sports team name and an event name, an event date, and the quantity of previously purchased tickets of similar quality available for purchase from other users.

21. The ticketing apparatus as defined in claim 14, wherein the at least the first computer instruction, when executed by the one or more processors is further configured to identify a current owner of the first ticket, and wherein the transmitted information includes information on the current owner of the first ticket.

22. The ticketing apparatus as defined in claim 14, further comprising the first ticket and the second ticket embodied in computer readable non-transitory tangible media, wherein the first ticket and the second ticket are configured to provide event access.

23. The ticketing apparatus as defined in claim 14, wherein the at least first instruction, when executed by the one or more processors, is further configured to automatically identify and transmit information to the first user relating to posting prices from other users for tickets for similar seats.

24. A ticketing apparatus, comprising:
one or more tangible non-transitory computer-readable media;
a first database, stored in the one or more tangible non-transitory computer readable media, including records that contain identifier codes associated with tickets;
a first networkable computing device, including one or more processors, configured to:
provide a user interface for display via a first user terminal to a first user, the user interface including:
a sale posting control configured to accept an instruction from the first user to post at least one ticket for sale to other users accessing a first networked computer resource, wherein the other users may submit purchase requests for the at least one ticket via the first networked computer resource;
a ticket forwarding control, different than the sale posting control, configured to accept an instruction from the first user to forward at least one ticket directly to another user without collecting payment from the other user via the apparatus;
receive a ticket transfer instruction transmitted over a network from by the first user, wherein the ticket transfer instruction includes at least a first code submitted by the first user, wherein the first code is associated with, and provided to the first user with a first ticket that had been previously sold to the first user, wherein the first ticket is for a first event, wherein the first ticket is a physical ticket; and
a first software module stored in the one or more tangible non-transitory computer readable media, the first software module, when executed by the computing device, configured to:
authenticate the first ticket prior to transferring the first ticket;
enable the first ticket to be transferred to a second user via the apparatus only if the first ticket is authenticated;
transform a validity of the first ticket associated with the first user into a validity of a second ticket associated with the second user by cancelling the first ticket and issuing the second ticket to the second user for the first event;
determine that the first user has returned the first ticket; and
in response to determining that the first user has returned the first ticket, issuing a payment to the first user.

25. The ticketing apparatus as defined in claim 24, wherein the ticketing apparatus is further configured to generate a code associated with the second ticket, wherein the code indicates that the second ticket is a result of a ticket transfer operation.

26. The ticketing apparatus as defined in claim 24, wherein the ticketing apparatus is further configured to generate and store in tangible non-transitory computer readable media an invalidation indication associated with the first ticket.

27. The ticketing apparatus as defined in claim 24, further comprising an account management module that includes instructions stored in tangible computer readable memory, that when executed by at least one processor is configured to:

access and transmit information to the first user terminal on tickets held by the first user, the information indicating:
which of the tickets held by the first user have been forwarded to other users, and
which of the tickets held by the first user have been posted for sale,
wherein forwarded tickets forwarded by the first user are electronically forwarded in response to an instruction from the first user provided using the ticket forwarding control, without collecting payment from recipients of the forwarded tickets via the apparatus and
wherein tickets posted for sale by the first user are posted for sale in response to an instruction from the first user provided using the ticket posting control.

28. A networked ticketing apparatus, comprising:
a first database including records that contain identifier codes associated with tickets;
a computing device including one or more processors;
a tangible non-transitory computer readable memory;
a first networkable server including instructions, stored in the tangible non-transitory computer readable memory, that when executed by the computing device, are configured to:
provide a user interface for display via a first user terminal to a first user, the user interface including:
a sale posting control configured to accept an instruction from the first user to post at least one ticket for sale to other users accessing a first networked computer resource, wherein the other users may submit purchase requests for the at least one ticket via the first networked computer resource; and
a ticket forwarding control, different than the sale posting control, configured to accept an instruction from the first user to forward at least one ticket directly to another user without collecting payment from the other user via the apparatus;
receive a ticket posting instruction transmitted over a network from the first user terminal by the first user, wherein the ticket posting instruction from the first user includes at least a first code that includes ticket authentication information, the first code previously provided to the first user with a first ticket that had been previously provided to the first user, the first ticket for a first seat at a first event;
authenticate the first ticket using at least the first code;
determine, based on the first code, whether the first ticket was forwarded to the first user by an initial ticket holder that purchased the first ticket or a corresponding first ticket from a ticket issuer, wherein a determination that the first ticket was forwarded to the first user indicates that the first user is to be limited in ability to sell the first ticket;
when it is determined that the first ticket was not forwarded to the first user:
post the ticket on the first networked computer resource;
receive an order instruction from a second user;
transform a validity of the first ticket associated with the first user into a validity of a second ticket associated with the second user by:
invalidating the first ticket at least partly in response to the order instruction; and
issuing the second ticket to the second user for the same seat at the same event as the first ticket; and when it is determined that the first ticket was forwarded to the first user, notify the first user that the transfer is prohibited.

29. The networked ticketing apparatus as defined in claim 28, wherein the instructions, when executed by the computing device, are further configured to generate a code associated with the second ticket, wherein the code associated with the second ticket indicates that the second ticket is a result of a resale operation.

30. The networked ticketing apparatus as defined in claim 28, wherein the instructions, when executed by the computing device, are further configured to:
automatically adjust a value of a previously posted first user specified parameter, wherein the first user specified parameter is a ticket asking price, and
to post that adjusted value in association with the first ticket, wherein the automatic adjustment of the ticket asking price is based at least in part on a first user instruction provided when the first user posted a previous asking price for the first ticket.

31. The networked ticketing apparatus as defined in claim 28, wherein the instructions, when executed by the computing device, are further configured to provide and store an invalidation indication in a database record associated with the first ticket to inhibit use of the first ticket.

32. The networked ticketing apparatus as defined in claim 28, wherein the instructions, when executed by the computing device, are further configured to provide a first form, separate from the first ticket, the first form including a barcode associated with the first ticket, the first form configured to be transmitted by the ticketing apparatus to the first user,
wherein the first form is to be returned with the first ticket in order for the first user to receive a first credit.

33. The networked ticketing apparatus as defined in claim 28, wherein the instructions, when executed by the computing device, are further configured to issue the first ticket via a download from a website.

34. The networked ticketing apparatus as defined in claim 28, wherein the instructions, when executed by the computing device, are configured to issue the first ticket as an electronic ticket.

35. The networked ticketing apparatus as defined in claim 28, wherein the instructions, when executed by the computing device, are further configured to:
receive the first code, previously provided to the first user, from the first user in conjunction with the ticket posting instruction; and
provide a first electronic form to the first user, the first electronic form configured to receive information from the first user for posting the first ticket, the first electronic form, when presented to the first user, including pre-populated information accessed from a database using the first code, the pre-populated information including at least seat information and event information.

36. The networked ticketing apparatus as defined in claim 28, wherein the instructions, when executed by the computing device, are configured to include in the second ticket at least one code that is not on the first ticket so that it can later be determined that the second ticket corresponds to a resold ticket.

37. The networked ticketing apparatus as defined in claim 28, further comprising the first ticket and the second ticket, wherein the first and second tickets are stored in non-transitory tangible media configured to provide access to the event.

38. The networked ticketing apparatus as defined in claim 28, wherein the instructions, when executed by the computing device, are further configured to automatically identify and transmit information to the first user relating to posting or sale prices from other users for the first event via an alert in the form of an email or an instant messaging service.

39. The networked ticketing apparatus as defined in claim 28, wherein the instructions, when executed by the computing device, are further configured to access and transmit information to the first user terminal on tickets that had been acquired by the first user, the information indicating:
which of the tickets acquired by the first user have been forwarded to other users, and
which of the tickets acquired by the first user have been posted for sale,
wherein forwarded tickets forwarded by the first user are electronically forwarded in response to an instruction from the first user provided using the ticket forwarding control, without collecting payment from recipients of the forwarded tickets via the apparatus and
wherein tickets posted for sale by the first user are posted for sale in response to an instruction from the first user provided using the ticket posting control.

40. The networked ticketing apparatus as defined in claim 28, wherein the instructions, when executed by the computing device, are further configured to provide and store in a database information regarding the issuance of the first ticket to the first user, the issuance of the second ticket to the second user, and an issuance of a third ticket to a third user for the first seat at the first event.

41. A computer-program product tangibly embodied in a non-transitory machine-readable storage medium, including instructions configured to cause one or more data processors to perform actions including:
providing a user interface for display via a first user terminal to a first user, the user interface including:
a sale posting control configured to accept an instruction from the first user to post at least one ticket for sale to other users accessing a first networked computer resource, wherein the other users may submit purchase requests for the at least one ticket via the first networked computer resource; and
a ticket forwarding control, different than the sale posting control, configured to accept an instruction from the first user to forward at least one ticket directly to another user without collecting payment from the other user via an apparatus;
receiving a ticket posting instruction transmitted over a network from the first user terminal by the first user, wherein the ticket posting instruction from the first user includes at least a first code that includes ticket authentication information, the first code previously provided to the first user with a first ticket that had been previously provided to the first user, the first ticket for a first seat at a first event, the first ticket being a physical ticket;
authenticating the first ticket using at least the first code;
determining, based on the first code, whether the first ticket was forwarded to the first user by an initial ticket holder that purchased the first ticket or a corresponding first ticket from a ticket issuer, wherein a determination that the first ticket was forwarded to the first user indicates that the first user is to be limited in ability to sell the first ticket;
when it is determined that the first ticket was not forwarded to the first user, posting the ticket on the first networked computer resource;

receiving an order instruction from a second user;
transforming a validity of the first ticket associated with the first user into a validity of a second ticket associated with the second user by:
  invalidating the first ticket at least partly in response to the order instruction; and
  issuing the second ticket to the second user for the same seat at the same event as the first ticket;
determining that the first user has returned the first ticket; and
at least partly in response to determining that the first user has returned the first ticket, issuing a credit to the first user.

42. A computer-program product tangibly embodied in a non-transitory machine-readable storage medium, including instructions configured to cause one or more data processors to perform actions including:
  providing a user interface for display via a first user terminal to a first user, the user interface including:
    a sale posting control configured to accept an instruction from the first user to post at least one ticket for sale to other users accessing a first networked computer resource, wherein the other users may submit purchase requests for the at least one ticket via the first networked computer resource; and
    a ticket forwarding control, different than the sale posting control, configured to accept an instruction from the first user to forward at least one ticket directly to another user without collecting payment from the other user via an apparatus;
  receiving a ticket posting instruction transmitted over a network from the first user terminal by the first user, wherein the ticket posting instruction from the first user includes at least a first code that includes ticket authentication information, the first code previously provided to the first user with a first ticket that had been previously provided to the first user, the first ticket for a first seat at a first event;
  authenticating the first ticket using at least the first code;
  determining, based on the first code, whether the first ticket was forwarded to the first user by an initial ticket holder that purchased the first ticket or a corresponding first ticket from a ticket issuer, wherein a determination that the first ticket was forwarded to the first user indicates that the first user is to be limited in ability to sell the first ticket;
  when it is determined that the first ticket was not forwarded to the first user:
    posting the ticket on the first networked computer resource;
    receiving an order instruction from a second user; and
    transforming a validity of the first ticket associated with the first user into a validity of a second ticket associated with the second user by:
      invalidating the first ticket at least partly in response to the order instruction; and
      issuing the second ticket to the second user for the same seat at the same event as the first ticket; and
  when it is determined that the first ticket was forwarded to the first user, notify the first user that the transfer is prohibited.

43. The computer-program product of claim 42, wherein historical data representing a history of electronic ticket sales or transfers is recorded in a system database.

* * * * *